United States Patent
Ryu et al.

(10) Patent No.: US 11,202,246 B2
(45) Date of Patent: *Dec. 14, 2021

(54) METHOD AND NETWORK DEVICE FOR RESPONDING TO REQUEST

(71) Applicant: LG Electronics Inc., Seoul (KR)

(72) Inventors: Jinsook Ryu, Seoul (KR); Hyunsook Kim, Seoul (KR); Sangmin Park, Seoul (KR); Bokyung Byun, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

This patent is subject to a terminal disclaimer.

(21) Appl. No.: 16/065,750

(22) PCT Filed: Jun. 15, 2018

(86) PCT No.: PCT/KR2018/006786
§ 371 (c)(1),
(2) Date: Jun. 22, 2018

(87) PCT Pub. No.: WO2018/231007
PCT Pub. Date: Dec. 20, 2018

(65) Prior Publication Data
US 2021/0168695 A1    Jun. 3, 2021

Related U.S. Application Data

(60) Provisional application No. 62/526,283, filed on Jun. 28, 2017, provisional application No. 62/526,286, (Continued)

(51) Int. Cl.
*H04W 48/04* (2009.01)
*H04W 4/16* (2009.01)
(Continued)

(52) U.S. Cl.
CPC .............. *H04W 48/04* (2013.01); *H04W 4/02* (2013.01); *H04W 4/16* (2013.01); *H04W 8/14* (2013.01);
(Continued)

(58) Field of Classification Search
CPC ......... H04W 48/04; H04W 8/16; H04W 8/14; H04W 68/005
See application file for complete search history.

(56) References Cited

U.S. PATENT DOCUMENTS 6,496,703 B1    12/2002 da Silva
10,420,016 B2 *  9/2019 Ryu ..................... H04W 4/16
(Continued)

FOREIGN PATENT DOCUMENTS

CN    101730029    6/2010
CN    101754311    6/2010
(Continued)

OTHER PUBLICATIONS

3rd Generation Partnership Project; Technical Specification Group Services and System Aspects; "System Architecture for the 5G System; Stage 2 (Release 15)," 3GPP TS 23.501 V1.0.0, dated Jun. 2, 2017, 146 pages.
(Continued)

*Primary Examiner* — Marisol Figueroa
(74) *Attorney, Agent, or Firm* — Fish & Richardson P.C.

(57) ABSTRACT

A first network device receives a request associated with data notification for a user equipment (UE). When the UE is in a mode in which communication of mobile terminated data is restricted and the first network device detects that the UE is in a non-allowed area, the first network device rejects the request unless the data notification is for a regulatory prioritized service.

6 Claims, 14 Drawing Sheets

Related U.S. Application Data filed on Jun. 28, 2017, provisional application No. 62/522,114, filed on Jun. 20, 2017, provisional application No. 62/520,490, filed on Jun. 15, 2017.

(51) Int. Cl.

| | | |
|---|---|---|
| *H04W 8/14* | (2009.01) | |
| *H04W 8/16* | (2009.01) | |
| *H04W 68/00* | (2009.01) | |
| *H04W 88/14* | (2009.01) | |
| *H04W 4/02* | (2018.01) | |
| *H04W 68/02* | (2009.01) | |
| *H04W 64/00* | (2009.01) | |
| *H04W 60/00* | (2009.01) | |
| *H04W 4/029* | (2018.01) | |
| *H04W 8/18* | (2009.01) | |
| *H04W 4/90* | (2018.01) | |

(52) U.S. Cl.
CPC ............ *H04W 8/16* (2013.01); *H04W 68/00* (2013.01); *H04W 68/005* (2013.01); *H04W 68/02* (2013.01); *H04W 88/14* (2013.01); *H04W 4/029* (2018.02); *H04W 4/90* (2018.02); *H04W 8/18* (2013.01); *H04W 60/00* (2013.01); *H04W 64/003* (2013.01)

(56) References Cited

U.S. PATENT DOCUMENTS

| | | | |
|---|---|---|---|
| 2004/0180655 A1 | 9/2004 | Jang et al. | |
| 2007/0223424 A1* | 9/2007 | Su | H04W 12/08 370/335 |
| 2008/0004045 A1* | 1/2008 | Srey | H04W 48/02 455/458 |
| 2008/0040458 A1 | 2/2008 | Zimmer et al. | |
| 2008/0160984 A1 | 7/2008 | Benes et al. | |
| 2011/0217947 A1 | 9/2011 | Czaja et al. | |
| 2012/0034910 A1 | 2/2012 | Fang et al. | |
| 2012/0094629 A1 | 4/2012 | Liu et al. | |
| 2012/0135701 A1* | 5/2012 | Zhu | H04W 68/00 455/404.1 |
| 2013/0273876 A1 | 10/2013 | Rasanen | |
| 2014/0169269 A1 | 6/2014 | Salot et al. | |
| 2015/0195812 A1 | 7/2015 | Park et al. | |
| 2015/0264619 A1 | 9/2015 | Zhang | |
| 2016/0295451 A1 | 10/2016 | Kumar et al. | |
| 2017/0289898 A1 | 10/2017 | Youn et al. | |
| 2018/0288582 A1 | 10/2018 | Buckley et al. | |
| 2018/0317194 A1 | 11/2018 | Chen et al. | |
| 2021/0168901 A1* | 6/2021 | Kim | H04W 76/25 |

FOREIGN PATENT DOCUMENTS

| | | |
|---|---|---|
| CN | 105723757 | 6/2016 |
| DE | 202015103656 | 9/2015 |
| JP | 2011097516 | 5/2011 |
| JP | 2013502759 | 1/2013 |
| KR | 20000031133 | 6/2000 |

OTHER PUBLICATIONS

Extended European Search Report in European Application No. 18818246.3, dated Jan. 22, 2020, 11 pages.

Samsung, "Session management in a mobility restriction area," S2-172872, SA WG2 Temporary Document, SA WG2 Meeting #120, Mar. 27-31, 2017, Busan, Korea, 5 pages.

Samsung, "Session management in a mobility restriction area," S2-172614, SA WG2 Temporary Document, SA WG2 Meeting #120, Mar. 27-31, 2017 Busan, Korea, 5 pages.

3rd Generation Partnership Project, "3GPP TS 23.501 V0.4.0 (Apr. 2017)," 3rd Generation Partnership Project Technical Specification Group Services and System Aspects; System Architecture for the 5G System; Stage 2 (Release 15), Apr. 31, 2017, 124 pages.

'3GPP; TSGSA; Procedures for the 5G System; Stage 2 (Release 15)', 3GPP TS 23.502 V0.4.0, Jun. 2, 2017, 125 pages.

'3GPP; TSGSA; System Architecture for the 5G System; Stage 2 (Release 15)', 3GPP TS 23.501 V0.3.1, Mar. 6, 2017, 98 pages.

Japanese Office Action in Japanese Application No. 2019-541358, dated Sep. 8, 2020, 7 pages (with English translation).

Qualcomm Incorporated, Sprint, LGE, "TS 23.502: PDU sessions handling for LADNs," S2-173111, SA WG2 Meeting #121, Hangzhou, P.R. China, dated May 15-19, 2017, 33 pages.

Samsung, "Support of a UE-initiated service in a non-allowed area," S2-173601, SA WG2 Meeting #121, Hangzhou, China, dated May 15-19, 2017, 2 pages.

United States Office Action in U.S. Appl. No. 16/179,659, dated Dec. 26, 2018, 19 pages.

United States Notice of Allowance in U.S. Appl. No. 16/179,659, dated Apr. 25, 2019, 8 pages.

US Office Action in U.S. Appl. No. 16/179,659, dated Dec. 26, 2018, 17 pages.

CN Office Action in Chinese Appln. No. 201880004092.7, dated Apr. 2, 2021, 15 pages (with English translation).

Ericsson, Verizon Wireless, "23.501: Introduction of the RRC Inactive state to 5G system architecture," S2-174076, 3GPP TSG-SA2 Meeting #121, Hangzhou, China, dated May 15-19, 2017, 5 pages.

\* cited by examiner (a) UE-P-GW user plane with E-UTRAN (b) Control Plane UE-MME (a)

(b)

(a)

(b)

METHOD AND NETWORK DEVICE FOR RESPONDING TO REQUEST

CROSS-REFERENCE TO RELATED APPLICATIONS

This application is a National Stage application under 35 U.S.C. § 371 of International Application No. PCT/KR2018/006786, filed on Jun. 15, 2018, which claims the benefit of U.S. Provisional Application No. 62/526,283, filed on Jun. 28, 2017, U.S. Provisional Application No. 62/526,286, filed on Jun. 28, 2017, U.S. Provisional Application No. 62/522,114, filed on Jun. 20, 2017, and U.S. Provisional Application No. 62/520,490, filed on Jun. 15, 2017. The disclosures of the prior applications are incorporated by reference in their entirety.

TECHNICAL FIELD

The present invention relates to a wireless communication system, and in particular, to a method and apparatus for responding to a request related to a user device.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication. Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

There is a method of effectively transmitting/receiving a signal in a new radio access technology.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method of responding to a request of a second network device by a first network device. The method may comprise: receiving, from the second network device, a request associated with data notification to a user equipment (UE) that is not in a mode in which communication of mobile terminated data is restricted; detecting that the UE is in a non-allowed area in which a communication service is restricted; and rejecting the request unless the data notification is for a regulatory prioritized service.

In another aspect of the present invention, provided herein is a first network device for responding to a request of a second network device. The first network device may include a transceiver and a processor configured to control the transceiver. The processor may be configured to: control the transceiver to receive, from the second network device, a request associated with data notification to a user equipment (UE) that is not in a mode in which communication of mobile terminated data is restricted; detect that the UE is in a non-allowed area in which a communication service is restricted; and control the transceiver to transmit rejection of the request unless the data notification is for a regulatory prioritized service.

The first network device may transmit paging for the UE to a radio access network device if the data notification is for the regulatory prioritized service.

The radio access network device may be a base station (BS).

The first network device may notify the second network device that the UE is in the non-allowed area, unless the data notification is for the regulatory prioritized service.

The regulatory prioritized service may be an emergency service or a multimedia priority service (MPS).

The first network device may be an access and mobility management network device.

The second network device may be a session management network device.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

In addition, a signal may be effectively transmitted/received in a system for supporting a new radio access technology.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
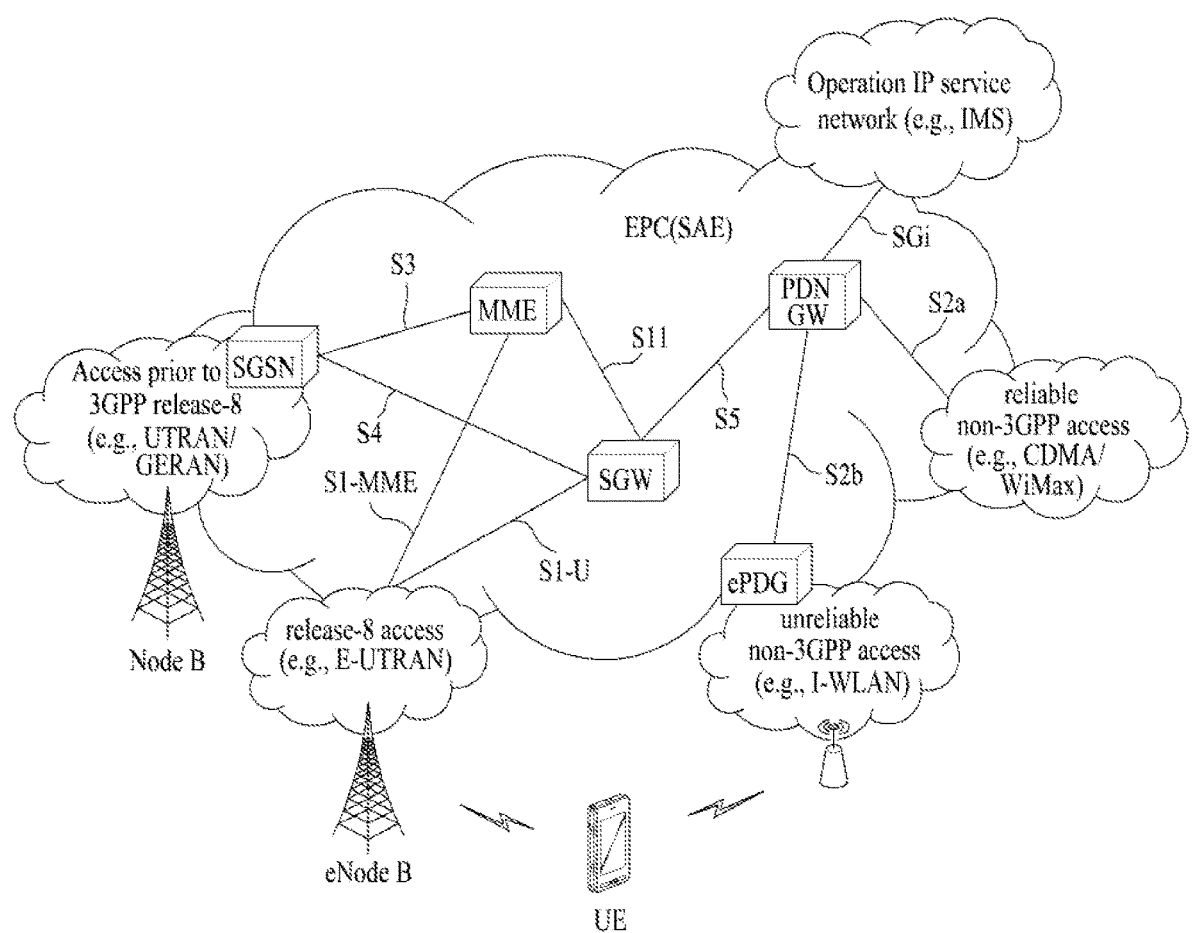
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution or New Radio (3GPP LTE/NR) system, and a 3GPP2 system. That is, steps or parts that are not described to clarify the technical features of the present invention may be explained with reference to the above standard specifications.

All terms disclose in the present specification are explained by the standard specifications. For example, in the present specification may be supported by one or more of 3GPP LTE standard specifications of 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, and 3GPP TS 24.301 and/or 3GPP NR standard specifications (e.g., 3GPP TS 38.331, 3GPP TS 23.501, and 3GPP TS 23.502).

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

gNB: A node that provides protocol termination of an NR user plane and a control plane toward a UE and is connected to a 5G core network (5GC) through a next generation (NG) interface (e.g., NG-C and NG-U).

5G core network (5GC): A core network connected to a 5G access network.

5G access network: An access network including 5G radio access network (5G-RAN) and/or non-5G access network (non-5G-AN) connecting to a 5G core network. The 5G-RAN may be referred to as a new generation access network (NG-RAN).

5G radio access network (5G-RAN) (or RAN): A radio access network that supports one or more of the following options with the common characteristics that it connects to 5GC: standalone new radio, new radio which is the anchor with enhanced E-UTRA expansions, standalone E-UTRA (e.g., eNB), and/or E-UTRA which is anchor with new radio expansions.

Network function (NF) service: Functionality exposed by a network function (NF) through a service-based interface and consumed by other authorized NFs.

5G System: A 3GPP system consisting of a 5G access network (AN), a 5G core network, and a UE. This is also referred to as a new radio (NR) system or a next generation system.

Network slice: A logical network that provides specific network capability(s) and network characteristic(s).

Network slice instance: A set of NF instance(s) and the required resources (e.g. compute, storage and networking resources) which form a deployed network slice.

Packet data unit (PDU) connectivity service: A service that provides exchange of PDU(s) between a UE and a data network.

PDU session: Association between a UE and a data network that provides PDU connectivity service. An association type may be an Internet protocol (IP) type, an Ethernet type, or an unstructured type.

Non-Access Stratum (NAS): A functional layer for transmitting and receiving signaling and traffic messages between a UE and a core network in an EPS and 5G system (5GS) protocol stack and for supporting mobility of the UE and supporting a session management procedure of the UE, IP address management, and so on.

NGAP UE association: The logical per UE association between a 5G-AN and an access and mobility management function (AMF).

NG-RAN: Radio access network of 5G system.

NG-C: Control plane interface between NG-RAN and 5GC.

NG-U: User plane interface between NG-RAN and 5GC.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
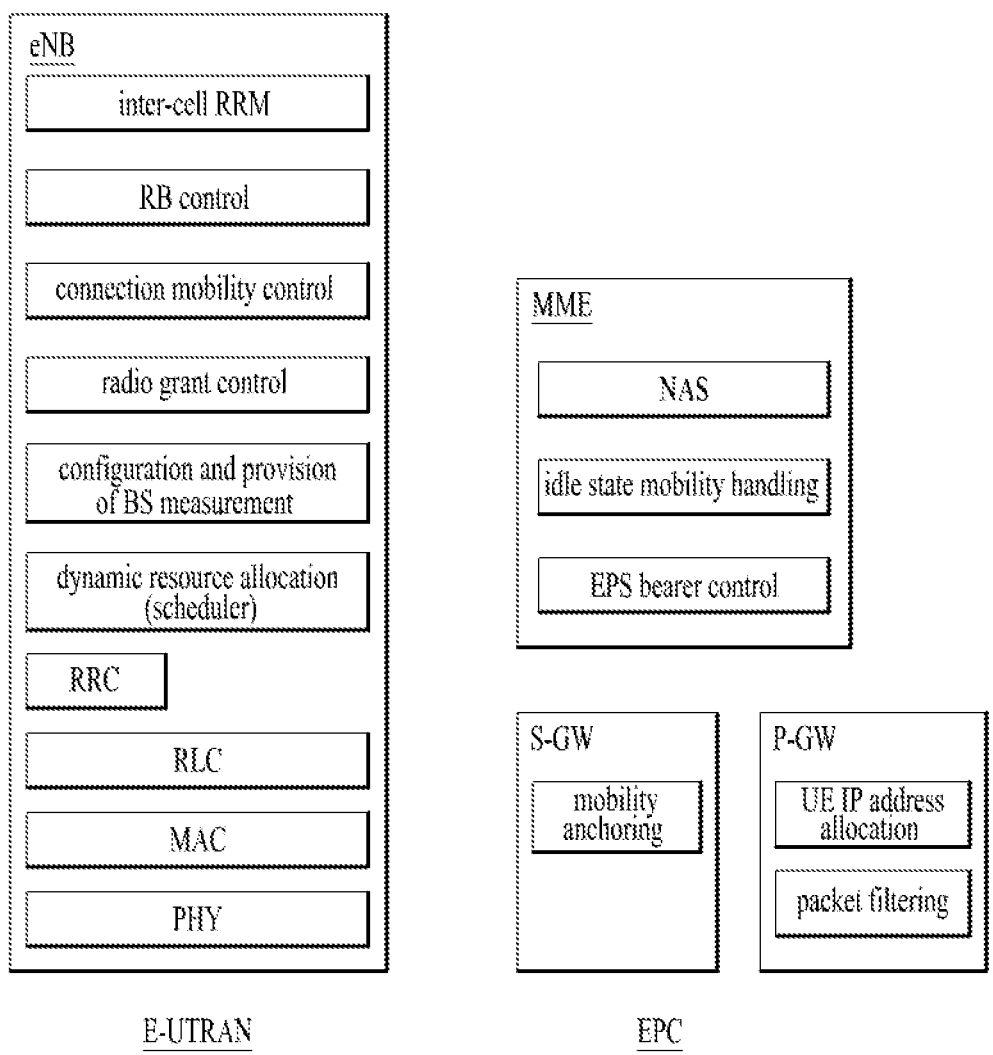
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
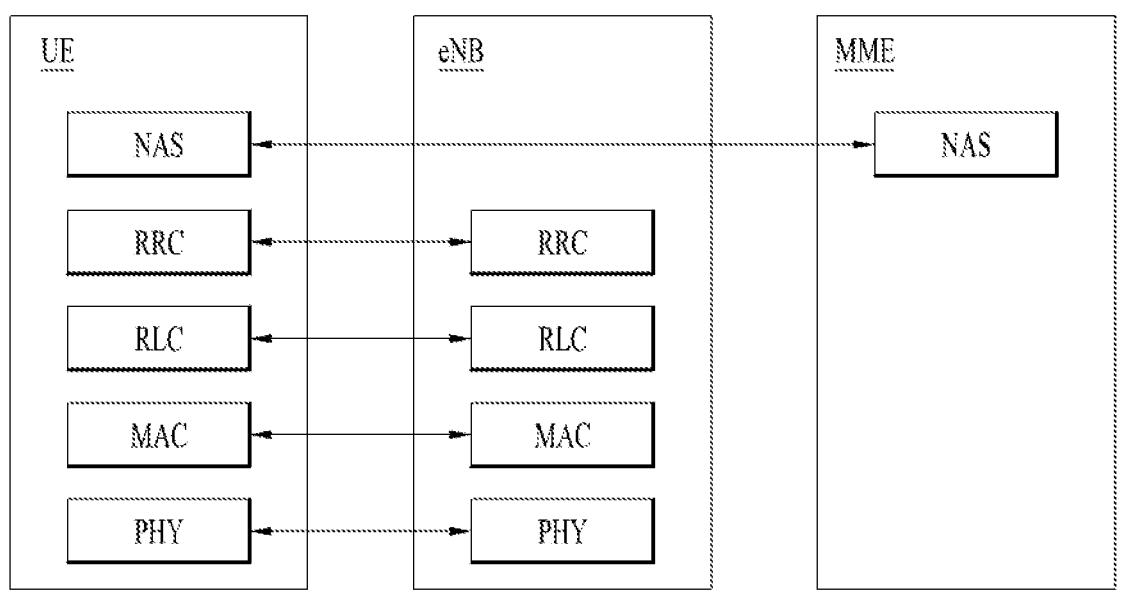
FIG. 3 is a diagram exemplarily illustrating the structure of a radio interface protocol in a control plane.
Figure 4:
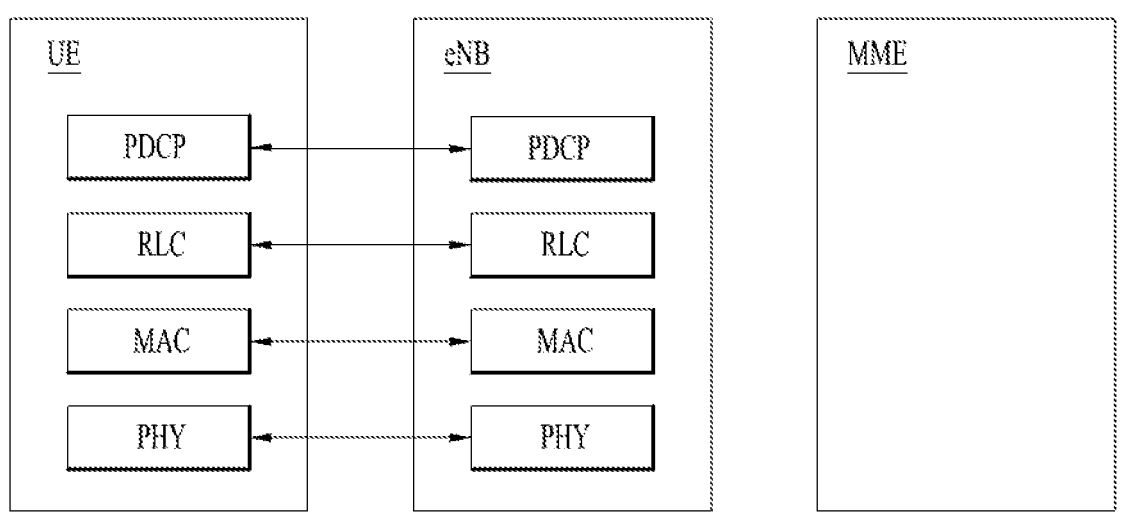
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
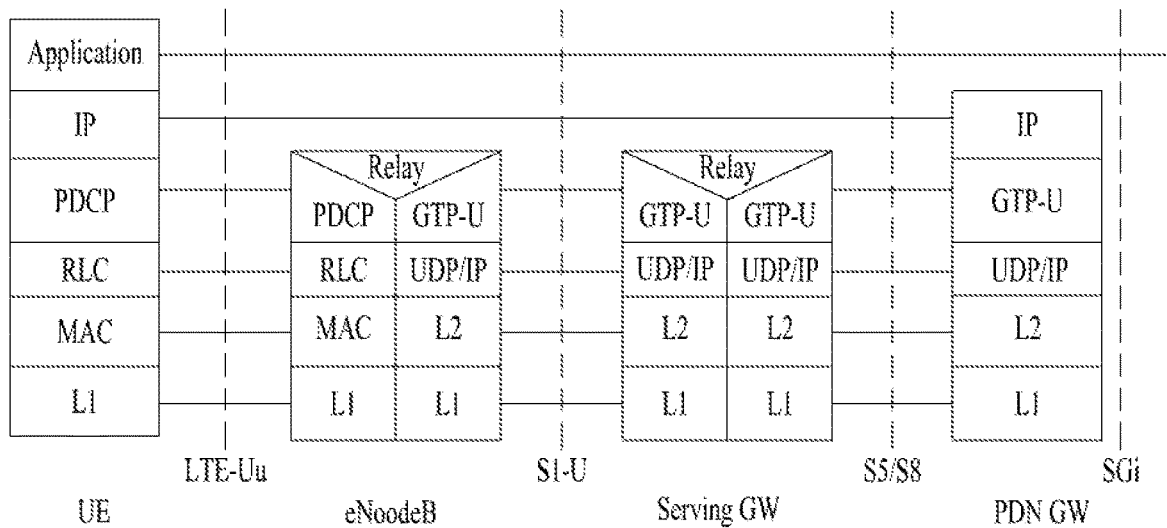
FIG. 5 is a diagram illustrating LTE (Long Term Evolution) protocol stacks for a user plane and a control plane.
Figure 5:
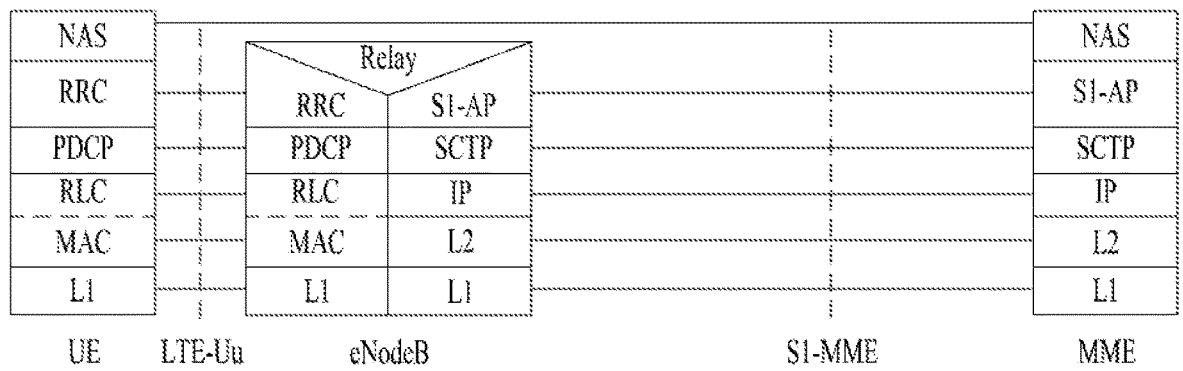

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
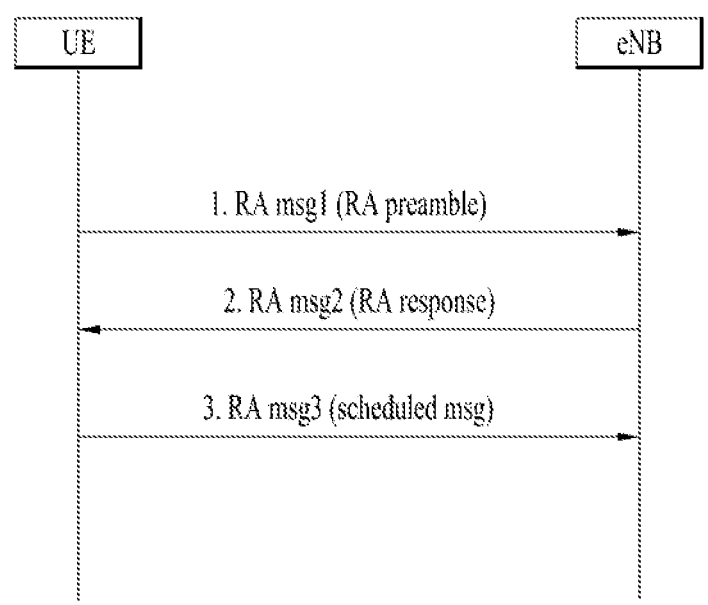
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

>1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

>2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

>3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
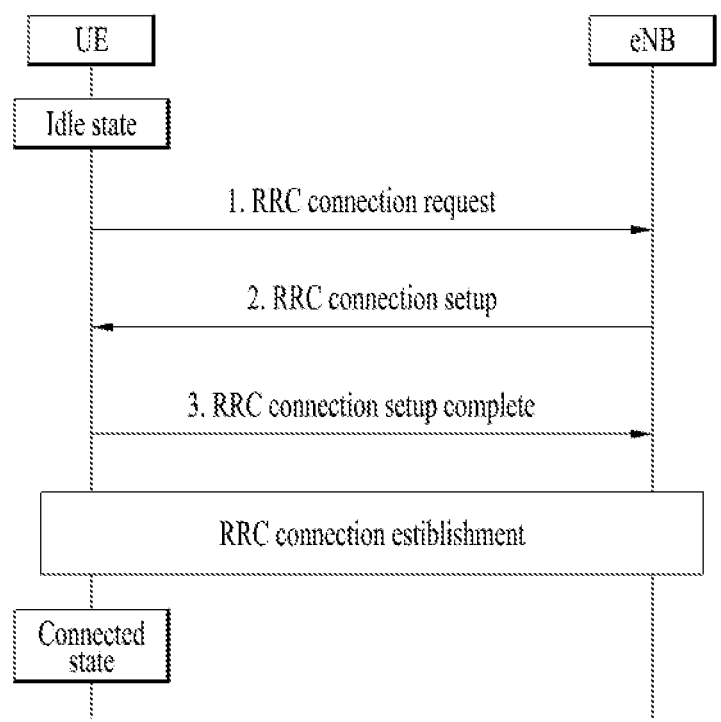
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in RRC_IDLE. Only when the UE staying in the idle state needs to establish RRC connection, does the UE establish RRC connection with the RRC layer of the eNB through the RRC connection procedure and then transition to the RRC_CONNECTED state.

The UE staying in RRC_IDLE needs to establish RRC connection in many cases. For example, the cases may include an attempt of a user to make a phone call, an attempt to transmit data, or transmission of a response message after reception of a paging message from the E-UTRAN.

In order for the UE in RRC_IDLE to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB.

>1. When the UE in RRC_IDLE desires to establish RRC connection for reasons such as an attempt to make a call, a data transmission attempt, or a response of the eNB to paging, the UE transmits an RRC connection request message to the eNB first.

>2. Upon receiving the RRC connection request message from the UE, the eNB accepts the RRC connection request of the UE when the radio resources are sufficient, and then transmits an RRC connection setup message, which is a response message, to the UE.

>3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC_CONNECTEDd mode.

Currently, research has been conducted into a next generation mobile communication system after EPC in 3GPP, that is, a 5G system. The 5G system supports radio access technology (RAT), eLTE, non-3GPP (e.g., WLAN) access, and so on as an enhanced technology from the 4G LTE mobile communication technology through evolution of a mobile communication network structure or a clean-state structure.

Figure 8:
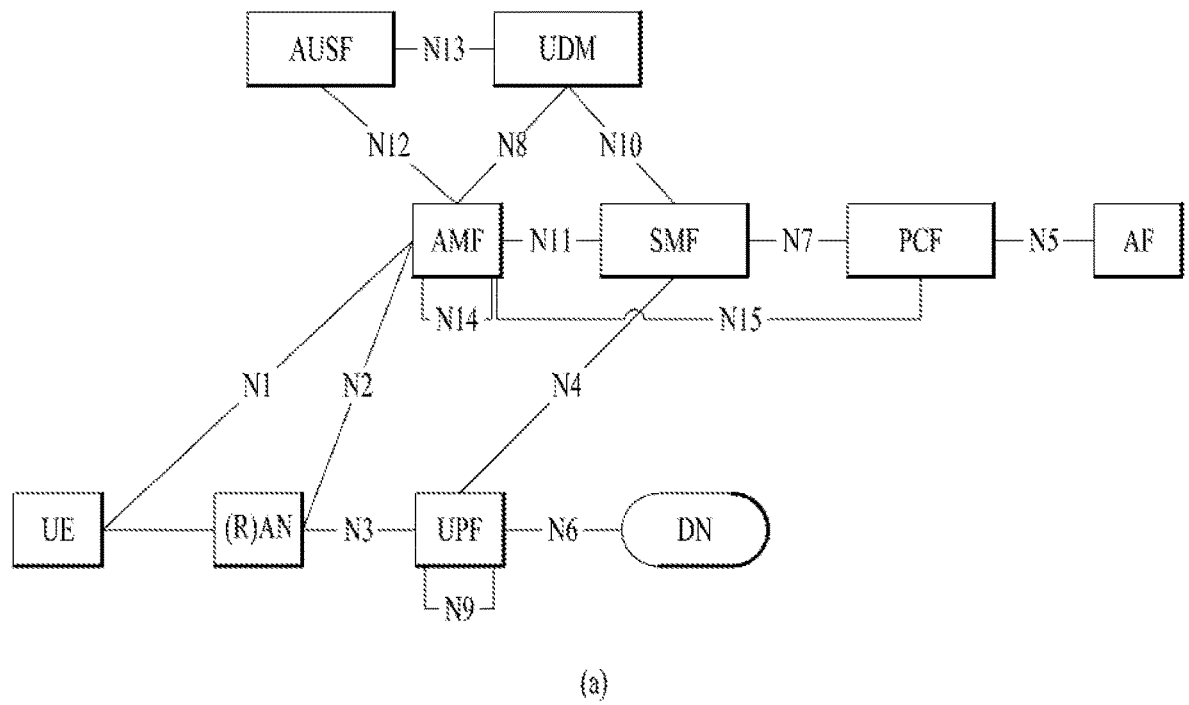
FIG. 8 illustrates an example of 5G system architecture.
Figure 8:
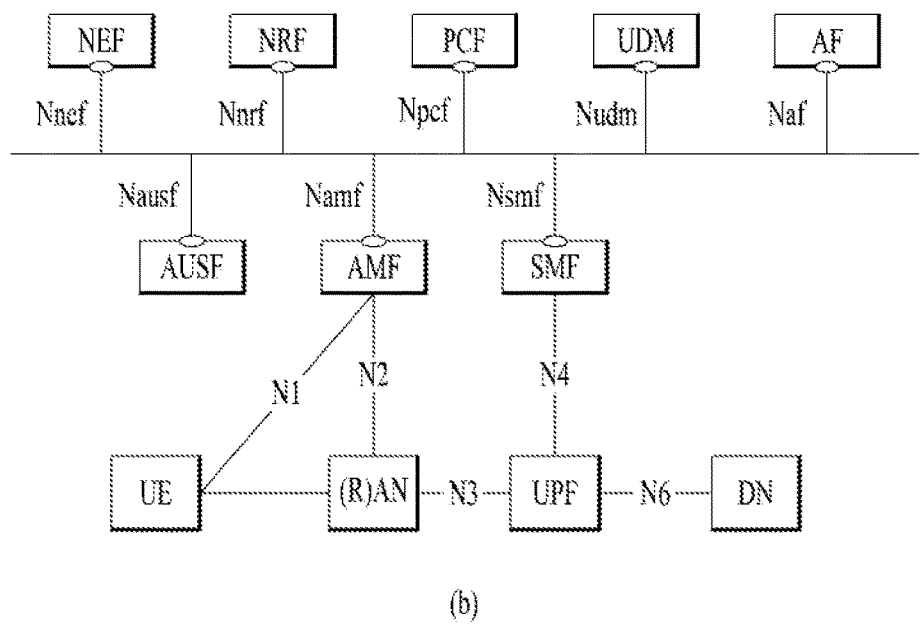

FIG. 8 illustrates an example of 5G system architecture. In particular, FIG. 8(a) illustrates an example of 5G system architecture via reference point representation. FIG. 8(b) illustrates an example of 5G system architecture via service-based representation. The 5G architecture is defined as service-based and the interaction between network functions is represented in two ways.

>Reference point representation (see FIG. 8(a)): This shows an interaction present between NF services in network functions described by point-to-point reference point (e.g., N11) between any two network functions (e.g., AMF and SMF).

>Service-based representation (see FIG. 8): Here, network functions (e.g., AMF) in a control plane enables other authorized network functions to access their services. This representation may also include point-to-point reference point where necessary.

Referring to FIG. 8(a), the 5G system architecture may include various network functions (NFs). The NFs included in the 5G system architecture may be, for example, an authentication server function (AUSF), an access and mobility management function (AMF), a data network (DN), a policy control function (PCF), a session management function (SMF), unified data management (UDM), a user plane function (UPF), a user equipment (UE), (radio) access network ((R)AN), and so on.

The AMF of the NFs of the 5G system may include, for example, the following functionality: Termination of RAN CP interface (i.e., N2 interface), termination of NAS (N1), NAS ciphering and integrity protection, AS security control, registration management (e.g., registration region management), connection management, IDLE mode UE reachability management, mobility management (e.g., which includes performing and control of paging retransmission), mobility management control (e.g., subscription and policy), a function of supporting intra-system mobility and inter-system mobility, support of network slicing, SMF selection, lawful intercept (LI) (with respect to an AMF event and an interface to an L1 system), a function of providing transport for session management (SM) messages between a UE and an SMF, access authentication, access authorization including roaming authority check, a function of providing an SMS message between a UE and a SMSF, a security anchor function (SEAF), security context management (SCM), etc. EPS bearer ID allocation for interworking with EPS, etc. All or some of functions of the AMF may be supported in a single instance of one AMF.

The DN of the NFs of the 5G system may refer to, for example, an operator service, Internet access, a $3^{rd}$ party service, or the like. The DN may transmit a downlink protocol data unit (PDU) to the UPF or may receive a PDU transmitted from a UE from the UPF.

The PCF may receive information on a packet flow from an application service and may provide a function of determining a policy such as mobility management and session management. In detail, the PCF may support a function of supporting a simplified policy framework for control of a network operation, a function of providing a policy rule to implement the policy rule by a control plane (CP) function(s) (e.g., AMF and SMF), a function of embodying a front end for related subscription and access for determination of a policy in a user data repository (UDR), etc.

The SMF may provide a session management function and, when a UE has a plurality of sessions, the respective sessions may be managed by different SMFs. In detail, the SMF may support a function such as session management (e.g., session establishment, modification, and release including maintenance of a tunnel between a UPF and an access network (AN) node), allocation and management of a UE IP address (which selectively includes authentication), selection and control of a user plane (UP), setting of traffic steering for routing traffic to an appropriate destination in the UPF, termination of an interface toward policy control functions, execution of a policy and a control part of QoS, lawful intercept (LI) (with respect to an SM event and an interface to an L1 system), an end of an SM part of an NAS message, downlink data notification (DDN), an initiator of AN-specific SM information (transport to AN through N2 via AMF), determination of an SSC mode of a session, and a roaming function. All or some of functions of the SMF may be supported in a single instance of one SMF.

The UDM may store user subscription data, policy data, and so on. The UDM may include two parts, that is, an application front end (FE) and a user data repository (UDR). The FE may include a UDM FE that is in charge of position management, subscription management, credential processing, and so on, and a PCF that is in charge of policy control. The UDR may store data required for functions provided by the UDM FE and a policy profile required by the PCF. The data stored in the UDR may include a subscription identifier, security credential, access and mobility related subscription data, and user subscription data including session related subscription data, and policy data. The UDM-FE may access the subscription information stored in the UDR to support a function such as authentication credential processing, user identification handling, access authentication, registration/mobility management, subscription management, and SMS management.

The UPF may transfer the downlink PDU received from the DN to a UE through the (R)AN and the uplink PDU received from the UE to the DN through the (R)AN. In detail, the UPF may support a function such as an anchor point for intra-RAT/inter-RAT mobility, an external PDU session point of interconnection to a data network, packet routing and forwarding, a user plane part of packet inspection and policy rule implementation, lawful intercept, traffic usage report, an uplink classifier for support of routing of traffic flow to a data network, a branching point for support of a multi-homed PDU session, QoS handling (e.g., packet filtering, gating, and uplink/downlink rate implementation) for a user plane, uplink traffic verification (SDF mapping between service data flow (SDF) and QoS flow), transport level packet marking in uplink and downlink, downlink packet buffering, and downlink data notification triggering. All or some of functions of the UPF may be supported in a single instance of one UPF.

The gNB may support functions for radio resource management (i.e., radio bearer control, radio admission control, connection mobility control, and dynamic allocation of resources to a UE in uplink/downlink (i.e., scheduling)), Internet protocol (IP) header compression, encryption and integrity protection of a user data stream and, selection of an AMF during attachment of a UE when routing to the AMF from information provided to the UE is not determined, user plane data routing to UPF(s), control plane information routing to the AMF, connection setup and release, scheduling and transmission (generated from the AMF) of a paging message, scheduling and transmission of system broadcast information (generated from the AMF or operating and maintenance (O&M)), measurement for mobility and scheduling and measurement report setting, transport level packet marking in uplink, session management, support of network slicing, mapping between QoS flow management and a data radio bearer, support of a UE in an inactive mode, a distribution function of a NAS message, a NAS node selection function, radio access network sharing, dual connectivity, and tight interworking between an NR and an E-UTRA.

Although FIG. 8(a) exemplifies a reference model of the case in which a UE accesses one DN using one PDU session for convenience, the present invention is not limited thereto. The UE may simultaneously access two data networks (e.g., a local DN and a central DN) using a plurality of PDU sessions. In this case, two SMFs may be selected for different PDU sessions. However, each SMF may have capability for controlling both a local UPF and a central UPF in a PDU session. In addition, the UE may simultaneously access two data networks (e.g., a local DN and a central DN) provided in a single PDU session.

In a 3GPP system, a conceptual link for connection between NFs in a 5G system is defined as a reference point. Reference points included in 5G system architecture represented in FIG. 8(a) are exemplified as follows.

N1: Reference point between the UE and the AMF.
N2: Reference point between the (R)AN and the AMF.
N3: Reference point between the (R)AN and the UPF.
N4: Reference point between the SMF and the UPF.
N5: Reference point between PCF and AF.
N6: Reference point between the UPF and a Data Network.
N7: Reference point between the SMF and the PCF.
N7r: Reference point between the PCF in the visited network and the PCF in the home network.
N8: Reference point between the UDM and the AMF.
N9: Reference point between two core UPFs.
N10: Reference point between the UDM and the SMF.
N11: Reference point between the AMF and the SMF.
N12: Reference point between AMF and AUSF.
N13: Reference point between the UDM and Authentication Server function (AUSF).
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N17: Reference point between AMF and EIR.
N18: Reference point between any NF and UDSF.
N19: Reference point between NEF and SDSF.

A service-based interface exemplified in FIG. 8(b) indicates a set of a service provided/exposed by a predetermined NF. Service-based interfaces included in a 5G system architecture represented in FIG. 8(a) are exemplified as follows.

Namf: Service-based interface exhibited by AMF.
Nsmf: Service-based interface exhibited by SMF.

Nnef: Service-based interface exhibited by NEF.
Npcf: Service-based interface exhibited by PCF.
Nudm: Service-based interface exhibited by UDM.
Naf: Service-based interface exhibited by AF.
Nnrf: Service-based interface exhibited by NRF.
Nausf: Service-based interface exhibited by AUSF.

An NF service is a type of capability exposed by an NF (i.e., an NF service producer) to another NF (i.e., an NF service consumer) through a service-based interface. The NF may expose one or more NF service(s). To specify NF services, the following criteria may be applied:

NF services are derived from an information flow that describes an end-to-end functionality.

A complete end-to-end message flow is explained by a sequence of NF service invocations.

Two operations that NFs provide their services through a service-based interface are described as follows:

i) "Request-response": Control plane NF_B (i.e., an NF service producer) may receive a request for providing of a specific NF service (which includes performing of an operation and/or providing of information) from another control plane NF_A (i.e., an NF service consumer). The NF_B transmits as response the NF service result based on information provided by the NF_A in the request.

In order to fulfil the request, the NF_B may in turn consume NF services from other NF(s). In a request-response mechanism, communication is one-to-one between two NFs (i.e., a consumer and a producer).

ii) "Subscribe-Notify"

Control plane NF_A (i.e., an NF service consumer) may subscribe to an NF service provided by another control plane NF_B (i.e., an NF service producer). A plurality of control plane NF(s) may subscribe to the same control plane NF service. The NF_B may notify interested NF(s) which subscribe to the NF service about a result of the NF service. A subscription request from a consumer may include a notification request for notification that is triggered through periodic updating or a specific event (e.g., requested information is changed or a specific threshold value is reached). The mechanism may also include the case in which NF(s) (e.g., NF_B) implicitly subscribes specific notification without an explicit subscription request (e.g., due to a successful registration procedure).

For NFs and reference points illustrated in FIG. 8, 3GPP TS 23.501 may be referenced.

Figure 9:
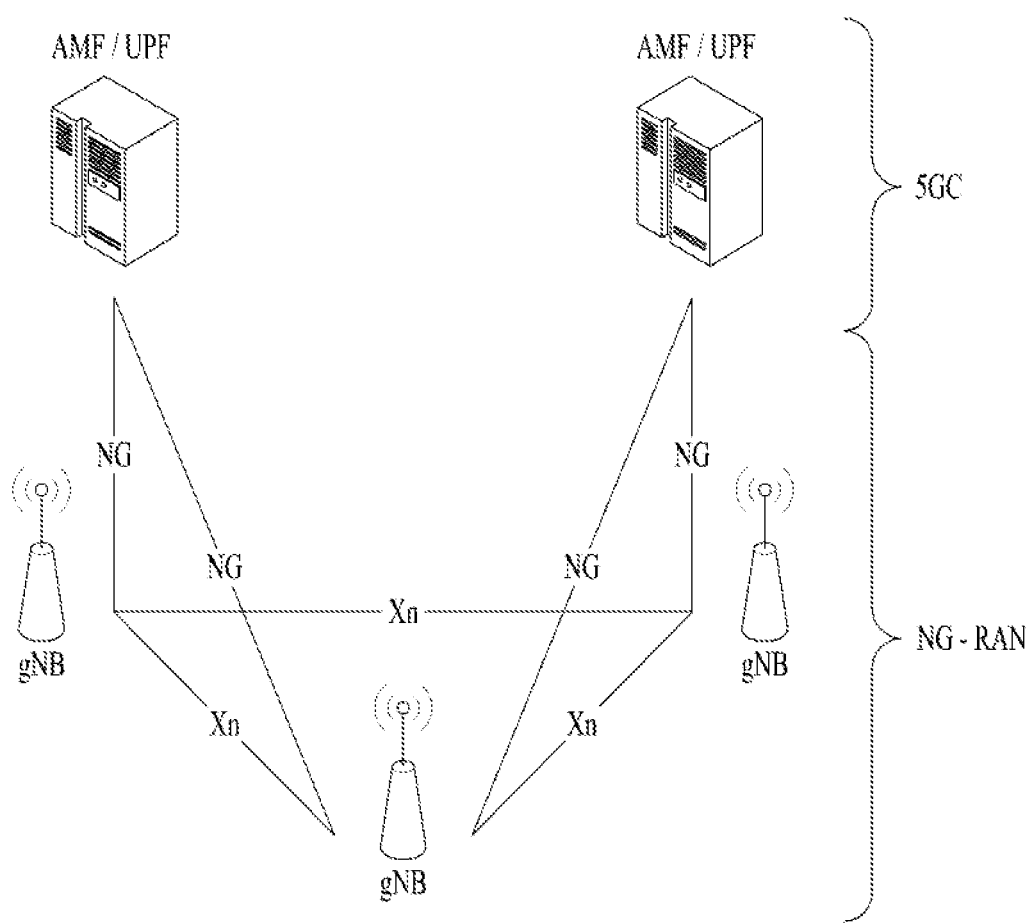
FIG. 9 illustrates an example of architecture of a new generation access network (NG-RAN).

FIG. 9 illustrates an example of architecture of a new generation access network (NG-RAN).

Referring to FIG. 9, NG-RAN (or which is also referred to as a 5G-RAN) may include gNB(s) and/or eNB(s), which provide terminations of user plane and control plane protocols toward a UE.

gNB(s) or eNB(s) connected to gNB(s) and a 5GC may be interconnected with each other using an Xn interface. gNB(s) and eNB(s) may be connected to a 5GC using an NG interface and, in detail, may be connected to an AMF using an NG-C interface (i.e., an N2 reference point) which is a control plane interface between an NG-RAN and a 5GC and may be connected to a UPF using an NG-U interface (i.e., an N3 reference point) which is a user plane interface between an NG-RAN and a 5GC.

Figure 10:
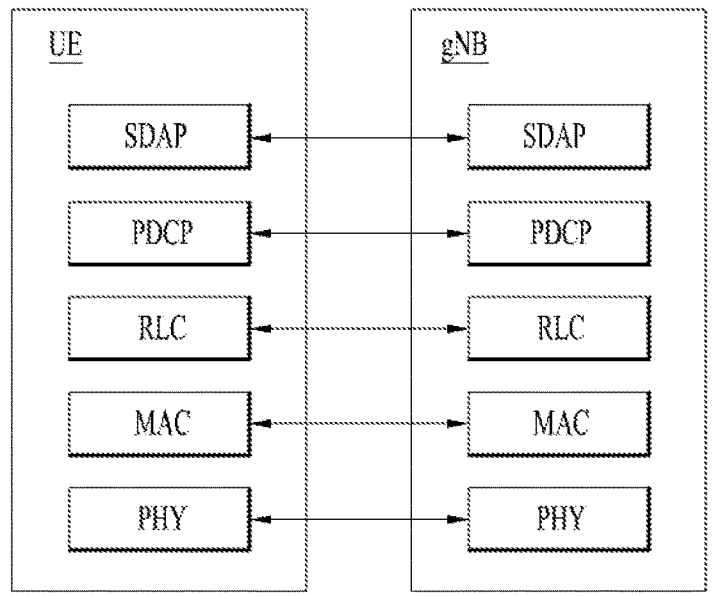
FIG. 10 illustrates an example of protocol stacks of a next generation wireless communication system.
Figure 10:
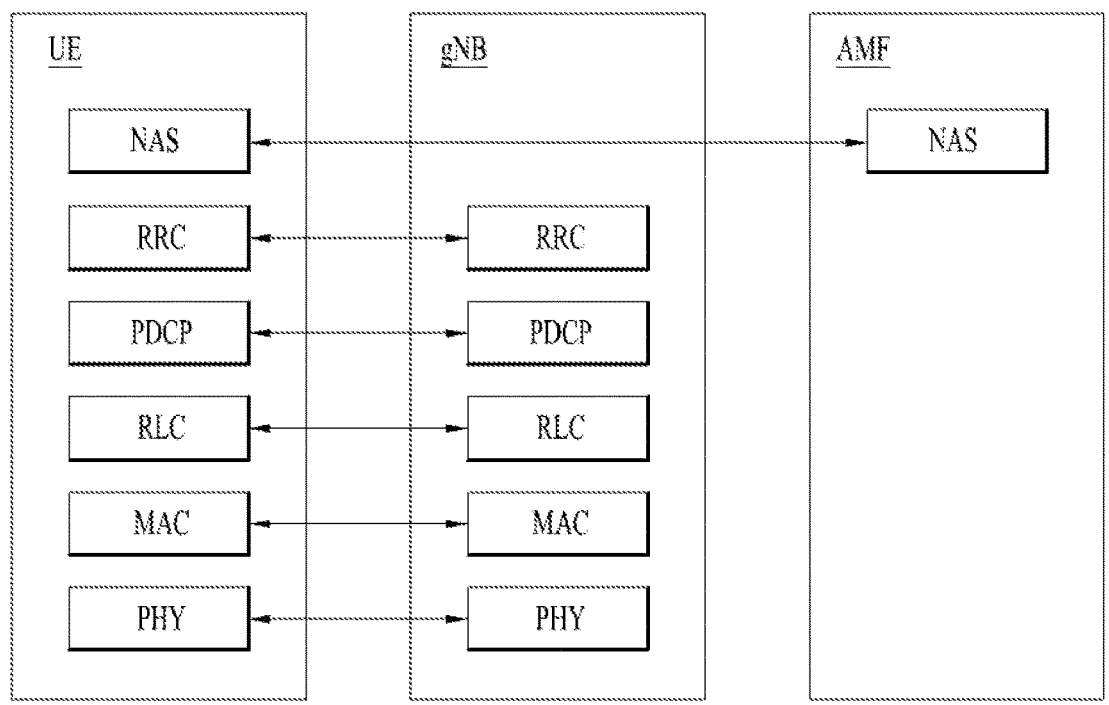

FIG. 10 illustrates an example of protocol stacks of a next generation wireless communication system. In particular, FIG. 10(*a*) illustrates an example of a radio interface user plane protocol stack between a UE and a gNB and FIG. 10(*b*) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 10(*a*), the user plane protocol stack may be divided into a first layer (Layer 1) (i.e., a physical layer (PHY) layer) and a second layer (Layer 2).

Referring to FIG. 10(*b*), the control plane protocol stack may be divided into Layer 1 (i.e., a PHY layer), Layer 2, Layer 3 (e.g., a radio resource control (RRC) layer), and a non-access stratum (NAS) layer.

Layer 2 may include a medium access control (MAC) sublayer, a radio link control (RLC) sublayer, and a packet data convergence protocol (PDCP) sublayer and, in the case of the user plane, may further include a service data adaptation protocol (SDAP) sublayer.

A radio bearer may be classified into two types as follows: A data radio bearer (DRB) for user plane data and a signaling radio bearer (SRB) for control plane data.

Hereinafter, each layer of a control plane and a user plane of a radio protocol is described.

A PHY layer as Layer 1 may use a physical channel to provide information transfer service from a higher layer. The physical layer may provide information transfer service from a higher layer. The physical layer may be connected to a MAC sublayer positioned at a higher level through a transport channel and data may be transmitted between the MAC sublayer and the PHY layer through the transport channel. The transport channel may be classified according to how data is transmitted through a radio interface and characteristics of data transmission. In addition, data may be transmitted through a physical channel between different physical layers and between a PHY layer of a transmission end and a PHY layer of a reception end.

The MAC sublayer may perform mapping between a logical channel and a transport channel; multiplexing/demultiplexing of a MAC service data unit (SDU) belonging to one or different logical channels to/from a transport block (TB) transferred to/from the PHY layer through a transport channel; scheduling information report; error correction through a hybrid automatic repeat request (HARD); priority handling between UEs using dynamic scheduling, priority handling between logical channels of one UE using logical channel prioritization; and padding. Different types of data may transfer a service provided by the MAC sublayer. Each logical channel type may define a type of transferred information. The logical channel may be classified into two groups: A control channel and a traffic channel.

The control channel may be used to transfer only control plane information and may be as follows.

Broadcast control channel (BCCH): A downlink channel for broadcasting system control information.

Paging control channel (PCCH): A downlink channel for transferring notification of change in paging information and system information.

Common control channel (CCCH): A channel for transmitting control information between a UE and a network. The channel may be used for UEs that have no RRC connection with a network.

Dedicated control channel (DCCH): A point-to-point interaction channel for transmitting dedicated control information between a UE and a network. The channel may be used by a UE having RRC connection.

A traffic channel may be used to use only user plane information:

Dedicated traffic channel (DTCH): A point-to-point channel dedicated to a single UE for transferring user information. The DTCH may be present in both uplink and downlink.

In downlink, connection between a logical channel and a transport channel is as follows. The BCCH may be mapped to the BCH. The BCCH may be mapped to the DL-SCH. The PCCH may be mapped to the PCH. The CCCH may be mapped to the DL-SCH. The DCCH may be mapped to the DL-SCH. The DTCH may be mapped to the DL-SCH.

In uplink, connection between a logical channel and a transport channel is as follows. The CCCH may be mapped to the UL-SCH. The DCCH may be mapped to the UL-SCH. The DTCH may be mapped to the UL-SCH.

The RLC sublayer may support three transmission modes: a transparent mode (TM), an unacknowledged mode (UM), and an acknowledged mode (AM). An RLC configuration may be applied for each logical channel. In the case of the SRB, the TM or the AM mode may be used and, on the other hand, in the case of the DRB, the UM or the AM mode may be used. The RLC sublayer may perform transfer of a higher layer PDU; independent sequence numbering from the PDCP; error correction through an automatic repeat request (ARQ); segmentation and re-segmentation; reassembly of the SDU; discard of the RLC SDU; and RLC re-establishment.

The PDCP sublayer for the user plane may perform sequence numbering, header compression and decompression (only in the case of robust header compression and RoHC); user data transfer; reordering and duplicate detection (when transferring is required toward a higher layer than the PDCP); (in the case of a split bearer) PDCP PDU routing; retransmission of a PDCP SDU; encryption and deciphering; discard of the PDCP SDU; PDCP re-establishment and data recovery for an RLC AM; and duplication of the PDCP PDU. The PDCP sublayer for the control plane may further perform sequence numbering; ciphering; deciphering and integrity protection; control plane data transfer; duplicate detection; and duplication of the PDCP PDU. When duplication for a radio bearer is configured via RRC, an additional RLC entity and an additional logical channel may be added to a radio bearer to control duplicated PDCP PDU(s). Duplication in the PDCP may include transmission of the same PDCP PDU(s) twice. Primarily, the PDCP PDU may be transferred to an original RLC entity and, secondarily, may be transferred to an additional RLC entity. In this case, an original PDCP PDU and a corresponding duplicate may not be transmitted in the same transport block. Two different logical channels may belong to the same MAC entity (in the case of CA) or may belong to different MAC entities (in the case of DC). In the former case, logical channel mapping restriction may be used to ensure that an original PDCP PDU and a corresponding duplicate are not transmitted in the same transport block.

The SDAP sublayer may perform i) mapping between a QoS flow and a data radio bearer and ii) marking QoS flow identifier (ID) in downlink and uplink packet. A single protocol entity of the SDAP may be configured for each separate PDU session but, in the case of dual connectivity (DC), two SDAP entities may be exceptionally configured.

The RRC sublayer may perform broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

In a legacy LTE system, when a UE is in an RRC_IDLE state over an access network, a UE is in an ECM_IDLE state over a core network when the UE is in an RRC_IDLE state over an access network and the UE is in an ECM_CONNECTED state in the core network when the UE is in an RRC_CONNECTED state over the access network. In other words, in the legacy LTE system, the UE in RRC_IDLE is a UE in ECM_IDLE and the RRC_CONNECTED UE is a UE in ECM_CONNECTED. In the case of a UE in IDLE, all S1 bearers (in S1-U) for the UE and logical S1-application protocol (S1-AP) signaling connection (over an S1-MME) may not be present. In the case of the UE in IDLE, in terms of a network, S1 signaling and RRC connection with the UE have not been established or have been released in a control plane, and a downlink S1 bearer and a data radio bearer (DRB) with the UE have not been established or have been released in a user plane. In terms of the UE IDLE, an IDLE state may mean that RRC connection and the DRB of a UE are not present in each of the control plane and the user plane. For example, when connection is released once through a connection release procedure, ECM connection between the UE and the MME may be released and all contexts associated with the UE may be deleted in an eNB. Then, the UE may be transitioned to an ECM_IDLE state from an ECM_CONNECTED in the UE and the MME and may be transitioned to an ECM_IDLE from an RRC_CONNECTED state in the UE and the eNB. Accordingly, connection control with the UE needs to be always performed by a core network and paging for the UE needs to be initiated and managed by the core network. Thus, traffic transfer between the UE and the network may be delayed. When a UE in RRC_IDLE intends to transmit traffic or a network intends to transmit traffic to the UE in RRC_IDLE, the UE may be transitioned to RRC_CONNECTED through a service request procedure and, the service request procedure includes exchange of various messages. Accordingly, traffic transport between the UE and the network may be delayed.

To reduce delay during a transition procedure between RRC_IDLE and RRC_CONNECTED, research has been conducted to introduce an RRC_INACTIVE state to an LTE-A system and to support an RRC_INACTIVE state in a 5G system. For ex ample, an RRC layer of the 5G system may support three states having the following characteristics (refer to 3GPP TR 38.804 V0.7.0).

RRC_IDLE
    Cell re-selection mobility;
    Paging for mobile terminated data is initiated by a core network (e.g., 5GC);
    Paging area is managed by core network (CN).

RRC_INACTIVE:
    Cell re-selection mobility;
    CN—NR RAN connection (both control and user planes) has been established for UE;

The UE access stratum (AS) context is stored in at least one gNB and the UE UE access stratum (AS);
Paging is initiated by NR RAN;
RAN-based notification area is managed by NR RAN;
NR RAN knows the RAN-based notification area which the UE belongs to;
RRC_CONNECTED:
The UE has an NR RRC connection;
The UE has an AS context in NR;
NR RAN knows the cell which the UE belongs to;
Transfer of unicast data to/from the UE;
Network controlled mobility, i.e. handover within NR and to/from E-UTRAN.

Figure 11:
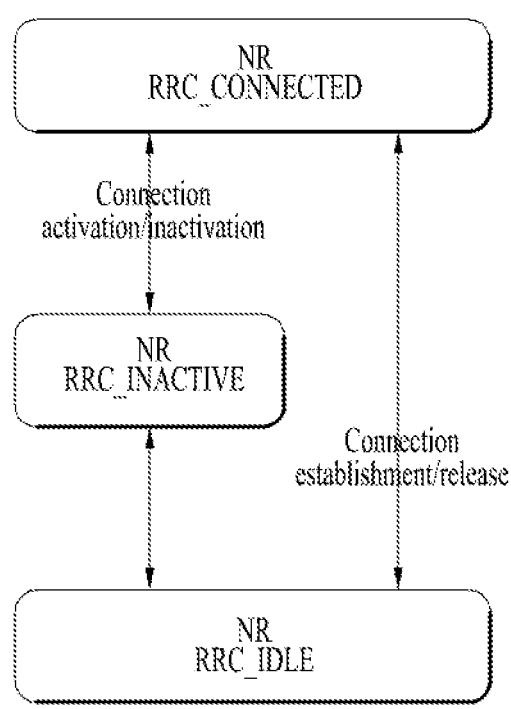
FIG. 11 illustrates UE state transitions in the next generation wireless communication system.

FIG. 11 illustrates UE state transitions in the next generation wireless communication system. A UE has only one RRC state at one time.

Referring to FIG. 11, the following state transitions are supported between the aforementioned RRC states: from RRC_IDLE to RRC_CONNECTED, following the "connection setup" procedure (e.g. request, setup, complete); from RRC_CONNECTED to RRC_IDLE, following (at least) the "connection release" procedure; from RRC_CONNECTED to RRC_INACTIVE, following the "connection inactivation" procedure; from RRC_INACTIVE to RRC_CONNECTED, following the "connection activation" procedure.

A UE in the RRC_INACTIVE state can be configured with the RAN-based notification area, whereupon: a notification area can cover a single or multiple cells, and can be smaller than CN area; a UE does not send any "location update" indication when it stays within the boundaries of the notification area; leaving the area, a UE updates its location to the network.

In the case of 4G communication, to register a UE to an EPS/LTE system and to maintain the registration state, the UE may perform an attachment procedure and a tracking area update (TAU) procedure (refer to 3GPP TS 23.401). In a 5G system, a registration procedure (refer to 3GPP TS 23.502) formed by combining a legacy attachment procedure and a TAU procedure may be performed. In the 5G system, registration management (RM) may be used to register or deregister a UE/user to a network and may establish a user context to the network. Two RM states of RM_DEREGISTRED and RM_REGISTERED may be used in the UE and the AMF and may reflect the registration state of the UE in the selected PLMN. Connection management (CM) may be used to establish or release signaling connection between the UE and the AMF. The CM may have functions of establishing and releasing signaling between the UE and the AMF over N1. The signaling connection may be used to enable NAS exchange between a UE and a core network and may include AN signaling connection between the UE and the AN (e.g., RRC connection over 3GPP access) and N2 connection for the UE between the AN and the AMF. To reflect NAS signaling connectivity of the UE with the AMF, two connection management (CM) states may be used: CM_IDLE and CM_CONNECTED. The CM_IDLE may be a state that is similar to or corresponds to ECM_IDLE of an LTE (i.e., 4G) system. The CM_CONNECTED may be a state that is similar to or corresponds to the ECM_CONNECTED of a legacy LTE system. A UE in CM_IDLE has no NAS signaling connection established with the AMF over N1 and there are no AN signaling connection, N2 connection, and N3 connection for the UE in CM_IDLE. The AMF may enter a CM_CONNECTED state with respect to the UE whenever N2 connection for the UE between the AN and the AMF is released. The UE in CM_CONNECTED may have a NAS signaling connection with the AMF over N1. The NAS signaling connection may use an RRC connection between the UE and the NG-RAN and may use an NGAP UE association between the AN and the AMF for 3GPP access. The UE in CM_CONNECTED may always enter a CM_IDLE state whenever the AN signaling connection is released. When a UE CM state in the AMF is CM_CONNECTED, a UE in ECM_CONNECTED is a UE in RRC_CONNECTED in the case of an LTE system with a version in which the AMF does not support RRC_INACTIVE but the UE in CM_CONNECTED may be a UE in RRC_CONNECTED or a UE in RRC_INACTIVE.

In terms of a core network, the UE in RRC_INACTIVE is similar to in the case in which the UE is in RRC_CONNECTED and, thus, data and signaling received by the core network are transferred directly to a RAN (e.g., gNB) from the core network but, to transfer the data/signaling to the UE by the RAN between the UE and the RAN, a produce in which the UE is awaken through a paging procedure and a connection between the UE and the RAN is re-established may be required.

Meanwhile, in the 5G system, reachability management is responsible for detecting whether the UE is reachable and providing UE location (i.e. access node) for the network to reach the UE. This is done by paging UE and UE location tracking. The UE location tracking includes both UE registration area tracking (i.e. UE registration area update) and UE reachability tracking (i.e. UE periodic registration area update). Such functionalities can be either located at 5GC (in the case of CM_IDLE state) or NG-RAN (in the case of CM_CONNECTED state). The UE and the AMF negotiate UE reachability characteristics for CM_IDLE state during registration and registration update procedures. The following two UE reachability categories are negotiated between UE and AMF for CM_IDLE state.

1) UE reachability allowing mobile terminated data while the UE is CM_IDLE state: The UE location is known by the network on a Tracking Area List granularity. Paging procedures apply to this category. Mobile originating and mobile terminated data apply in this category for both CM_CONNECTED and CM_IDLE state.

2) Mobile initiated connection only (MICO) mode: Mobile originated data applies in this category for both CM_CONNECTED and CM_IDLE state. Mobile terminated data is only supported when the UE is in CM_CONNECTED stat. In other words, in a MICO mode, mobile terminated communication may be restricted in CM_IDLE.

In the CM_IDLE state, the UE and the AMF may activate the MICO mode to optimize power efficiency and signaling efficiency of the UE. A UE may indicate preference for MICO mode during Initial Registration or Registration Update procedure. The AMF, based on local configuration, expected UE Behavior if available, UE indicated preferences, UE subscription information and network policies, or any combination of them, determines whether MICO mode is allowed for the UE and indicates it to the UE during Registration procedure. If the UE does not indicate preference for MICO mode during Registration procedure, the AMF does not activate MICO mode for this UE. The UE and the AMF re-negotiate the MICO mode at every subsequent Registration procedure. When the UE is in CM_CONNECTED, the AMF may deactivate MICO mode by triggering Registration Update procedure through UE Configuration Update procedure. If mobility restrictions are applied to a UE in MICO mode, the AMF needs to allocate an allowed area/non-allowed area to the UE. When the AMF indicates MICO mode to a UE, the AMF considers the UE always unreachable while the UE CM state in the AMF is CM_IDLE. The AMF rejects any request for downlink data delivery for UE in MICO mode and whose UE CM state in the AMF is CM_IDLE. The UE in MICO mode is only reachable for mobile terminated data or signaling when the UE is in CM_CONNECTED. A UE in MICO mode need not listen to paging while in CM_IDLE. A UE in MICO mode may stop any access stratum procedures in CM_IDLE, until the UE initiates transition from CM_IDLE to CM_CONNECTED due to one of the following triggers:

A change in the UE (e.g. change in configuration) requires an update of its registration with the network.
Periodic registration timer expires.
Mobile originated data pending.
Mobile originated signaling pending (e.g., SM procedure initiated).

The Service Request procedure is used by a UE in CM_IDLE state or the 5GC to request the establishment of a secure connection to an AMF. The Service Request procedure is also used both when the UE is in CM_IDLE and in CM_CONNECTED to activate a User Plane connection for an established PDU Session. There are a UE triggered service request that the UE in CM_IDLE state initiates in order to send uplink signaling messages, user data, or as a response to a network paging request, and a network triggered service request used when the network needs to signal (e.g. N1 signaling to UE, mobile-terminated SMS, user plane connection activation for PDU Session(s) to deliver mobile terminating user data) with a UE.

Figure 12:
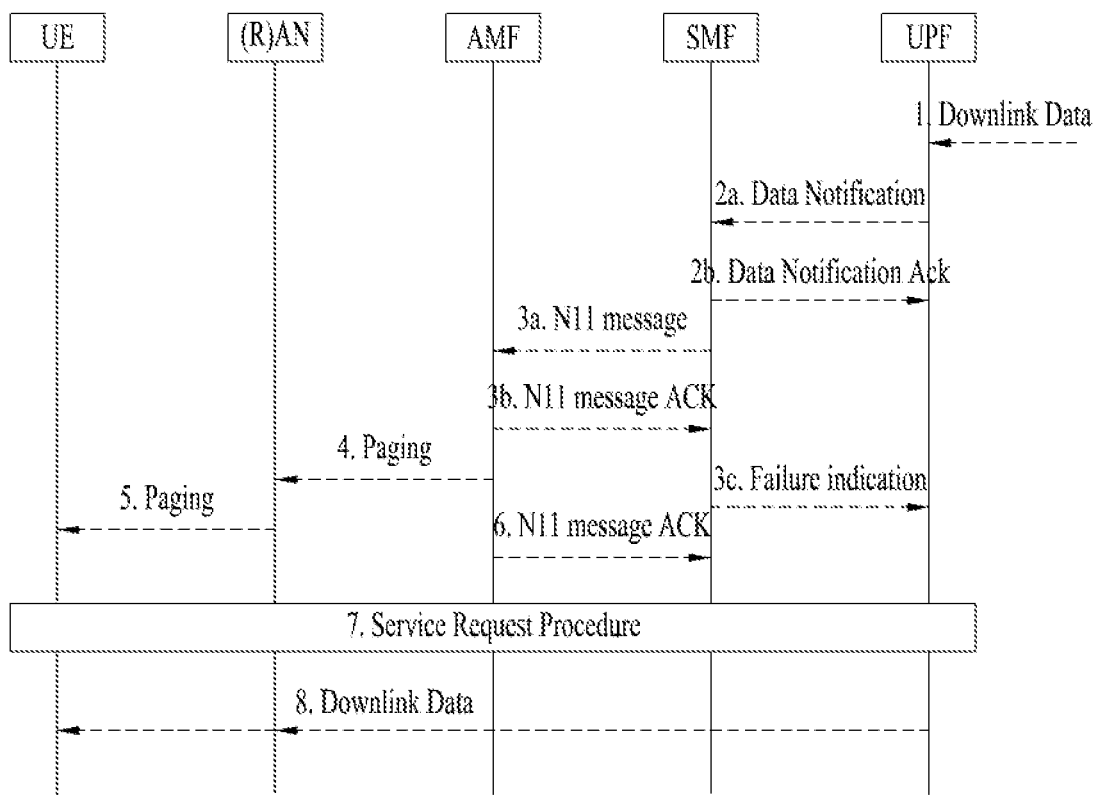
FIG. 12 illustrates an example of a network triggered Service Request procedure in a next generation system.

FIG. 12 illustrates an example of a network triggered Service Request procedure in a next generation system.

If the UE is in CM_IDLE state or CM_CONNECTED state, the network initiates a network triggered Service Request procedure. If the UE is in CM_IDLE state, and asynchronous type communication is not activated, the network sends a Paging Request to (R)AN/UE. The Paging Request triggers the Service Request procedure in the UE. If asynchronous type communication is activated, the network stores the received message and forward the message to the (R)AN and/or the UE (i.e. synchronizes the context with the (R)AN and/or the UE) when the UE enters CM_CONNECTED state.

With reference to FIG. 12, the network triggered Service Request procedure is briefly described below.

>1. When UPF receives downlink data of a PDU session and there is no (R)AN tunnel information stored in UPF for the PDU session, the UPF buffers the downlink data, unless the UPF has previously been indicated buffering-off.

>2a. UPF to SMF: Data Notification (containing PDU session ID).

>2b. SMF to UPF: Data Notification ACK.

>3a. SMF to AMF: N11 message (containing UE (i.e., subscriber) Permanent ID, PDU session ID, N2 SM information (e.g. QoS profile, CN N3 Tunnel Info), and etc.). Unless the SMF was previously notified that the UE is unreachable, upon reception of a Data Notification message, the SMF determines the AMF and sends an N11 message to the AMF including the PDU Session ID received in step 2a.

>3b. [conditional] The AMF responds to the SMF.

If the UE is in CM_IDLE state, and the AMF determines that the UE is not reachable for paging, the AMF either sends an N11 message to the SMF, or other network functions from which AMF received the request message in step 3a, indicating the UE is not reachable, or the AMF performs asynchronous type communication and store the N11 message. If asynchronous type communication is invoked and the AMF stored an N11 message, the AMF initiates communication with the UE and (R)AN when the UE is reachable e.g. when the UE enters CM_CONNECTED.

If the UE is in MICO mode, the AMF rejects the request from the SMF and may notify the SMF that the UE is unreachable (in case the SMF had not subscribed to the UE reachability) with an indication that the SMF needs not send downlink (DL) data notifications to the AMF. The AMF stores an indication that the SMF has been informed that the UE is unreachable.

If the Registration procedure with AMF change is in progress when the old AMF receives a N11 message, the old AMF may reject N11 message with an indication that the N11 message has been temporarily rejected.

>3c. [conditional] SMF responds to the UPF. SMF may notify the UPF about the User Plane setup failure. If the SMF receives an indication from the AMF that the UE is, the SMF may, based on network policies, either indicate to the UPF to stop sending Data Notifications and/or to stop buffering DL data or apply extended buffering. Upon receiving the information that the N11 message requested from an SMF has been temporarily rejected, and receiving the Downlink Data Notification from UPF, the SMF may request the UPF to apply extended buffering.

>4. [conditional] AMF sends Paging message to (R)AN node.

When the UE is in a CM_CONNECTED state, the AMF may perform a part of the

UE triggered Service Request procedure for activating a user plane connection for the PDU session (refer to the UE triggered Service Request procedure of 3GPP TS 23.502). If the UE is in RM_REGISTERED state and CM_IDLE and reachable, the AMF sends a Paging message (containing NAS ID for paging, Registration Area list, Paging discontinuous reception (DRX) length, Paging Priority indication, and etc.) to (R)AN node(s) belonging to the Registration Area(s) in which the UE is registered.

>5. [Conditional] The (R)AN node pages the UE.

If (R)AN nodes receive paging messages from the AMF, the UE is paged by the (R)AN node.

>6. [Conditional] AMF to SMF:AMF to SMF:N11 message ACK. The AMF supervises the paging procedure with a timer. If the AMF receives no response from the UE to the Paging Request message, the AMF may apply further paging according to any applicable paging strategy. If the AMF receives no response from the UE, the AMF considers the UE as unreachable and the SM N2 message cannot be routed to the (R)AN, so the AMF shall return an "N11 message Reject" with an appropriate "failure cause", e.g. UE unreachability, to SMF or other network functions to indicate the failure of "message routing service", unless the AMF is aware of an ongoing MM procedure that prevents the UE from responding, i.e. the AMF receives an N14 Context Request message indicating that the UE performs Registration procedure with another AMF.

>7. When UE is in the CM-IDLE state, upon reception of paging request, the UE initiates the UE triggered Service Request procedure.

>The UPF transmits the buffered downlink data toward UE via (R)AN node which performed the Service Request procedure.

In FIG. 12, the N11 message and the N11 message ACK may be messages transferred over an N11 interface that is an interface between the SMF and the AMF and the N11 message and the N11 message ACK may also be referred to as different terms. Detailed parts of the network triggered Service Request procedure described with reference to FIG. 12, which are not associated or are less associated directly with the present invention to be described later, are understood with reference to 3GPP TS 23.502.

Figure 13:
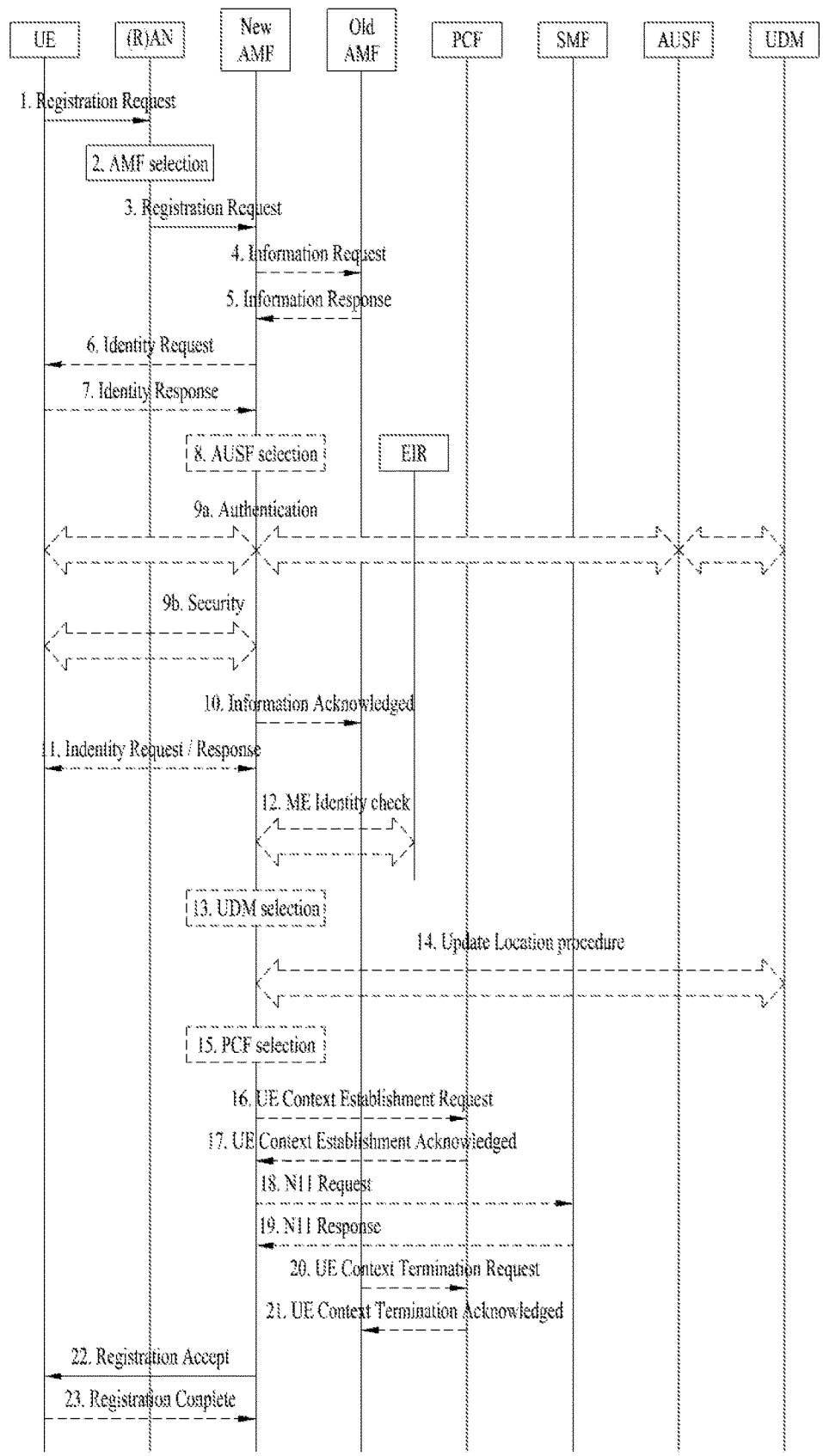
FIG. 13 illustrates an example of a general registration procedure in a next generation system.

FIG. 13 illustrates an example of a general registration procedure in a next generation system.

>1. UE to (R)AN: AN message (containing AN parameters, Registration Request (Registration type, subscriber permanent identifier (SUPI) or 5G globally unique temporary identity (5G-GUTI), Security parameters, network slice selection assistance information (NSSAI), PDU session status, PDU session(s) to be re-activated and MICO mode preference) and etc.).

>2 If a SUPI is included or the 5G-GUTI does not indicate a valid AMF the (R)AN, based on (R)AT and NSSAI, if available, selects an AMF.

>3. (R)AN to new AMF: N2 message (containing N2 parameters, Registration Request (Registration type, Subscriber Permanent Identifier or 5G-GUTI, Security parameters, NSSAI and MICO mode preference) and etc.)

>4. [Conditional] new AMF to old AMF: Information Request (containing complete Registration Request). If the UE's 5G-GUTI was included in the Registration Request and the serving AMF has changed since last registration, the new AMF may send Information Request to old AMF including the complete Registration Request IE to request the UE's SUPI and MM Context.

>5. [Conditional] old AMF to new AMF: Information Response (SUPI, MM Context, SMF information).

>6. [Conditional] new AMF to UE: Identity Request. If the SUPI is not provided by the UE nor retrieved from the old AMF the Identity Request procedure is initiated by AMF sending an Identity Request message to the UE.

>7. [Conditional] UE to new AMF: Identity Response. The UE responds with an Identity Response message including the SUPI.

>8. The AMF may decide to invoke an AUSF. In that case, the AMF, shall be based on SUPI, select an AUSF.

>9a. The AUSF initiates authentication of the UE.

>9b. The AMF initiates NAS security functions.

>10. [Conditional] new AMF to old AMF: Information Acknowledged. If the AMF has changed the new AMF acknowledge the transfer of UE MM context.

>11. [Conditional] new AMF to UE: Identity Request. If the permanent equipment identity (PEI) was not provided by the UE nor retrieved from the old AMF the Identity Request procedure is initiated by AMF sending an Identity Request message to the UE to retrieve the PEI.

>12. Optionally the new AMF initiates ME identity check.

>13. If step 14 is to be performed, the new AMF, based on the SUPI, selects a UDM.

>14. If the AMF has changed since the last registration, or if there is no valid subscription context for the UE in the AMF, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the new AMF initiates the Update Location procedure. The new AMF provides the access type it serves for the UE to the UDM and the access type is set to "3GPP access". The UDM stores the associated access type together with the serving AMF. This will cause the UDM to initiate a Cancel Location to the old AMF corresponding to 3GPP access, if one exists. The old AMF removes the MM context and notifies all possibly associated SMF(s), and the new AMF creates an MM context for the UE after getting the AMF related subscription data from the UDM.

>15. Conditionally the new AMF, based on the SUPI, selects a PCF.

>16. [Optional] new AMF to PCF: UE Context Establishment Request (containing SUPI). If the AMF has not yet obtained Access and Mobility policy for the UE or if the Access and Mobility policy in the AMF are no longer valid, the AMF requests the PCF to apply operator policies for the UE.

>17. PCF to new AMF: UE Context Establishment Acknowledged (containing Access and Mobility policy data)

>18. [Conditional] new AMF to SMF: N11 Request. If the UE was in MICO mode and the AMF had notified an SMF of the UE being unreachable and that the SMF needs not to send DL data notifications to the AMF, the AMF informs the SMF that the UE is reachable.

>19. SMF to new AMF: N11 Response.

>20. [Conditional] old AMF to PCF: UE Context Termination Request. If the old AMF previously requested UE context to be established in the PCF, the old AMF terminates the UE context in the PCF.

>21. PCF to AMF: UE Context Termination Acknowledged.

>22. New AMF to UE: Registration Accept (containing 5G-GUTI, Registration area. Mobility restrictions, PDU session status, NSSAI, Periodic registration update timer, LADN Information, accepted MICO mode, and etc.). If the UE included MICO mode in the request, then AMF responds whether MICO mode should be used.

>23. [Conditional] UE to new AMF: Registration Complete. The UE sends a Registration Complete message to the AMF to acknowledge if a new 5G-GUTI was assigned.

In FIG. 13, the N11 Request and the N11 Response may be messages transferred over an N11 interface that is an interface between the SMF and the AMF and the N11 Request and the N11 Response may also be referred to as different terms. Detailed parts of the general registration procedure described with reference to FIG. 13, which are not associated or are less associated directly with the present invention to be described later, are understood with reference to 3GPP TS 23.502.

As regards the UE mobility, mobility restrictions restrict mobility handling or service access of a UE in the 5G System, and the mobility restriction functionality is provided by the UE, the radio access network and the core network. Mobility Restrictions only apply to 3GPP access, they do not apply to non-3GPP access. Mobility Restrictions for CM_IDLE state and, for CM_CONNECTED state when in RRC_INACTIVE state are executed by the UE based on information received from the core network. Mobility Restrictions for CM_CONNECTED state when in RRC_CONNECTED state are executed by the radio access network and the core network. In CM_CONNECTED state, the core network provides Mobility Restrictions to the radio access network with a Handover Restriction List. Mobility restrictions consists of RAT restriction, Forbidden area, and Service area restrictions as follows.

RAT restriction: defines the 3GPP Radio Access Technology(ies), a UE is not allowed to access. In a restricted RAT a UE is based on subscription not permitted to initiate any communication with the network.

Forbidden area: in a Forbidden area under a given RAT, the UE is based on subscription not permitted to initiate any communication with the network.

Service area restrictions: defines areas in which the UE may or may not initiate communication with the network as follows. Service area restrictions define an allowed area where the UE is allowed to initiate communication and a non-allowed area where the UE is allowed to the registration procedure but no other communication. In an Allowed area under a given RAT, the UE is permitted to initiate communication with the network as allowed by the subscription. In a Non-allowed area under a given RAT a UE is service area restricted based on subscription. The UE and the network are not allowed to initiate Service Request or SM signalling to obtain user services (both in CM-IDLE and in CM-CONNECTED states). The RM procedures in a non-allowed area are unchanged compared to when the UE is in an allowed area. The UE in a non-allowed area shall respond to core network paging with Service Request (e.g. network triggered service request). This is because paging is RM signaling (e.g., UE configuration update) or an emergency service but not a user service.

For a given UE, the core network determines the service area restrictions based on UE subscription information. Optionally the allowed area may in addition be fine-tuned by the policy control function (PCF) e.g. based on UE location, permanent equipment identifier (PEI) and network policies. Service area restrictions can be changed due to, e.g. subscription, location, PEI and/or policy change. Service area restrictions may be updated during a registration procedure. If the UE has overlapping areas between RAT restrictions, Forbidden areas, Allowed areas and Non-allowed areas, or any combination of them, the UE proceeds in the following precedence order:

The evaluation of RAT restrictions takes precedence over the evaluation of any other mobility restrictions; and The evaluation of forbidden areas takes precedence over the evaluation of allowed areas and non-allowed areas.

A UE overrides any forbidden area and non-allowed area restrictions whenever access to the network for regulatory prioritized services like emergency services and multimedia priority service (MPS). Also the network overrides any non-allowed area restrictions for regulatory prioritized services like emergency services and MPS. A service area restriction may contain one or more (e.g. up to 16) entire tracking areas. The UE's subscription data may contain either allowed or non-allowed areas using explicit tracking area identities. The allowed area may also be limited by a maximum allowed number of tracking areas, or the allowed area may alternatively be configured as unlimited i.e. it may contain all tracking areas of the PLMN. The registration area of a UE in the non-allowed area consists of a set of tracking areas (TAs) which belongs to a non-allowed area of the UE. The registration area of a UE in the allowed area consists of a set of TAs which belongs to an allowed area of the UE. The UDM stores the service area restrictions of a UE as part of the UE's subscription data. The PCF in the serving network may (e.g. due to varying conditions such as UE's location, application in use, time and date) further adjust service area restrictions of a UE, either by expanding an allowed area or by reducing a non-allowed area or by increasing the maximum allowed number of tracking areas. The UDM and the PCF may update the service area restrictions of a UE at any time. For the UE in CM_CONNECTED state the AMF updates the UE and RAN immediately. For UE in CM_IDLE state the AMF may page the UE immediately or store the updated service area restriction and update the UE upon next signaling interaction with the UE. During registration, if the service area restrictions of the UE are not present in the AMF, the AMF fetches from the UDM the service area restrictions of the UE that may be further adjusted by the PCF. The serving AMF enforces the service area restrictions of a UE. A limited allowed area given by a maximum allowed number of tracking areas, may be dynamically assigned by the AMF adding, any not yet visited (by the UE) tracking areas to the allowed area until the maximum allowed number of tracking areas is reached. When the AMF assigns a limited allowed area to the UE, then the AMF provides the UE with any pre-configured and/or dynamically assigned allowed area. For a UE in CM_CONNECTED state the AMF indicates the service area restrictions of this UE to the RAN. The UE stores the received Mobility restrictions, and complies with them in the area that is identified in the mobility restrictions. Upon change of serving AMF due to mobility, the old AMF may provide the new AMF with the service area restrictions of the UE that may be further adjusted by the PCF. The network may perform paging for a UE in a Non-allowed area to update service area restrictions with Generic UE Configuration Update procedure (see 3GPP TS 23.502). In case of roaming, the service area restrictions are transferred from the UDM via the serving AMF to the serving PCF in the visited network. The serving PCF in the visited network may further adjust the service area restrictions.

Referring to FIG. 8(a), when an N3 interface is established between the (R)AN and the UPF, data/signaling provided to the UPF from the DN may be transferred directly to the (R)AN. When there is no N3 interface, upon receiving data from the DN, the UPF may notify the SMF about data to be transmitted and the SMF may transmit a data notification related message to the AMF (refer to step 3a of FIG. 12). In general, when a UE is in a CONNECTED state (e.g., a CM_CONNECTED state), the AMF may perform a procedure for establishment of an N3 interface and, when the UE is in RRC_IDLE or RRC_INACTIVE, the AMF may perform paging. However, mobility restrictions, in particular, a non-allowed area in which a UE is allowed to perform a registration procedure and to receive paging in a specific area but a service request and a user service is not allowed are proposed. That is, when the UE is in a MICO mode, the UE is in a state in which it is not possible to receive paging and, on the other hand, when the UE is positioned in the non-allowed area, paging may be possible. When the UE is in the non-allowed area, the UE may not be in a CONNECTED state (e.g., a CM_CONNECTED state). Accordingly, there is a problem in terms of whether a paging procedure needs to be performed on the UE through a legacy general network triggered service procedure even when the UE is in the non-allowed area. The present invention proposes a method of controlling a data service when a UE is positioned in a non-allowed area. For example, the present invention proposes a method of processing the data notification when an AMF receives a request (e.g., N11 message) indicating that there is DL data about the UE in the non-allowed area, from the SMF.

In the case of the network triggered Service Request procedure, the present invention proposes that upon a downlink data notification (DDN) related message the AMF transmit rejection of the DDN related message to an SMF instead of transmitting paging, if the UE recognizes that the UE does not apply MICO and the UE is in a non-allowed area. However, when the AMF checks allocation and retention priority (ARP) information included in the received DDN related message and recognizes that corresponding data is the regulatory prioritized service (e.g., an emergency service or a MPS), the present invention proposes that the AMF transmit paging and do not reject the DDN related request even when the UE is in a non-allowed area. In the present invention, when the AMF transmits rejection of the request of the SMF via the DDN to the SMF because the UE is in the non-allowed area, the AMF may transmit along with indication/cause indicating that the UE is in a service unable area. The indication/cause may include information indicating that the UE is in the non-allowed area. Rejection of the request of the SMF because the UE is positioned in the non-allowed area may be indicated with a different cause from the case in which the UE uses a MICO mode and so on. For example, in step 3a of FIG. 12, according to the present invention, if the SMF has not been informed that that the UE is unreachable or is in a non-allowed area, the SMF may determine an AMF and may transmit an N11 message including the PDU session ID received in step 2a to the AMF upon receiving the data notification message. That is, in step 3a of FIG. 12, an SMF that has been informed that the UE is in a non-allowed area in which the UE is reachable only for regulatory prioritized services may not transmit a request (e.g., an N11 message) related to data notification of a PDU session other than the regulatory prioritized services, to the AMF. As another example, in step 3b of FIG. 12, according to the present invention, when a UE is not in a MICO mode and an AMF detects that the UE is in a non-allowed area, unless a request (e.g., data notification related request to an AMF from an SMF) from the SMF is for regulatory prioritized services, the AMF may reject the request from the SMF and may notify the SMF that the UE is reachable only for the regulatory prioritized services. As another example, according to the present invention, when the SMF receives indication indicating that the UE is unreachable or is in a non-allowed area, from the AMF, the SMF may order the UPF to stop transmitting data notification and/or to stop buffering DL data or order the UPF to apply extended buffering based on the network policies in step 3c of FIG. 12.

The AMF having rejected the downlink data notification related request from the SMF may store information indicating that the corresponding DDN rejection is transmitted to the SMF and, that is, the AMF may store information indicating that the SMF has been informed that the UE is in a service restricted area (e.g., a non-allowed area). When the UE is moved to an allowed area during a registration procedure in the future, the AMF may use the information to notify the SMF that a service of the UE is allowable.

According to the present invention, upon receiving DDN rejection with a corresponding cause from the AMF, the SMF may not transmit DDN according to a network policy (for a UE that is in a non-allowed area unless the DDN is a DDN for regulatory prioritized services) (e.g., even if the SMF receives an additional DL packet before receiving notification indicating that the UE enters an allowed area from the AMF, the SMF does not make a request (DDN transmission) to the AMF for transmission of the additional DL packet) or may order the UPF to turn off buffering. As necessary, the SMF may perform PDU session release.

Then, when the UE performs a registration procedure according to mobility, for example, in step 18 of FIG. 13, according to the present invention, if the AMF has stored an event that the AMF has transmitted DDN rejection to the SMF because the UE is positioned in a service unable area (which is also referred to as a service restricted area) (or a non-allowed area) and if the AMF detects that the UE enters an allowed area, the AMF may notify the SMF that the UE moves to a service enable area. In this case, the SMF may order the UPF to start buffering of a corresponding PDU session or may re-initiate a stopped DDN operation.

According to the present invention, an N4 interface related interaction between the SMF and the UPF is described now. The SMF(s) may support end-to-end functions over PDU sessions (including any N4 interface for controlling UPF(s)). When the UPF is aware that some DL data arrives at a UE without a downlink N3 tunnel, the SMF may interact with the AMF to trigger activation of user plane resources for the PDU session unless the SMF recognizes that the UE is unreachable and that it is not required to transmit DL data notifications to the AMF or the UE is in a non-allowed area (except for regulatory prioritized services). If the UE is in a CM_IDLE state and the UE is not in a MICO mode and if the UE is not in a non-allowed area or even if the UE is in the non-allowed area, paging for the UE is for regulatory prioritized services, the AMF may trigger UE paging from the AN (depending on a type of the AN). If the UE is in a MICO mode, the AMF may notify the SMF that the UE is unreachable and it is not required to send DL data notification to the AMF. If the UE is in a non-allowed area, the AMF may reject a DDN request (which is not for regulatory prioritized services) from the SMF and may notify the SMF that the UE is in a service restricted area.

Thus far, a downlink service related operation with respect to a UE positioned in a non-allowed area has been proposed in terms of a core network. Hereinafter, the downlink service related operation with respect to the UE in the non-allowed area is described in terms of a RAN level. In particular, hereinafter, a method of effectively performing a non-allowed area related operation by a BS when a UE is in an RRC_INACTIVE state is further proposed. When a UE recognizes that the UE belongs to a non-allowed tracking area in a CM-IDLE state based on non-allowed tracking area information received from a network, the UE may not perform a mobile originated service. Upon receiving handover restriction from the AMF while converting into CM_CONNECTED, the RAN may not perform handover using only a cell belonging to the handover restriction list or a cell belonging to a tracking area indicated by the handover restriction list. When handover is not possible except for in a cell belonging to a mobility restricted area (e.g., a non-allowed area) of a UE, a source RAN may perform RRC release and, accordingly, the UE may not perform a service request for next user data transmission. If the AMF recognizes that the UE is in a non-allowed area, the AMF may perform an operation for deactivation for a corresponding PDU session or PDU release. For example, the AMF may notify the SMF that the UE is moved to a service unable area (i.e., a service restricted area). However, if the UE is in an RRC_INACTIVE state, a current state is a state in which a method of operating a network is not currently and clearly defined. For example, because the RAN manages mobility of the UE when the UE is in CM_CONNECTED/RRC_CONNECTED, there may be a limit in handover to a cell of a non-allowed area by the UE using a handover restriction list or the like and, when only non-allowed area cells are present around the UE, RRC connection may be released and it may be possible to control the mobility of the UE as if the UE performs a service request in CM_IDLE. However, when the UE is in RRC_INACTIVE, mobility is controlled via cell reselection by the UE and, thus, it may not be possible to accurately control the mobility. When the UE is in RRC_INACTIVE while being in CM_CONNECTED, an N3 interface between the UPF and the RAN may be maintained and user data may be immediately provided to a RAN node from the UPF irrespective of whether the UE is in an RRC_CONNECTED state and, when the RAN transmits paging for the data and, then, the UE responds to the paging in a mobility restricted region (e.g., a non-allowed area), an operation related to whether the data should be continuously transmitted to the UE may not be clear. This may cause a problem in terms of a mobility restricted (in particular, service area restrictions) operation. To overcome this problem, the present invention proposes the following operation by the RAN.

When a UE responds to paging or makes a request for RAN based notification update, the RAN (e.g., a gNB) may recognize that the UE is positioned in a non-allowed area. In this case, upon receiving a downlink packet, the RAN may check QoS information (e.g., the RAN checks an ARP value of the downlink packet to identify an MPS or an emergency service) of the downlink packet and determine whether paging transmission is performed for the UE. If the QoS information of the downlink packet received for the UE does not correspond to the MPS or the emergency service, the RAN may stop paging transmission. When stopping paging transmission (e.g., when rejecting downlink data transmission), the RAN may transmit a SM N2 message (including a session ID) to notify an SMF supporting a corresponding PDU (through the AMF) that downlink data transmission fails because the UE is in a service unable area for the PDU session. Then, the RAN or the SMF may make a request for deactivation of the PDU session or may trigger PDU release.

Figure 14:
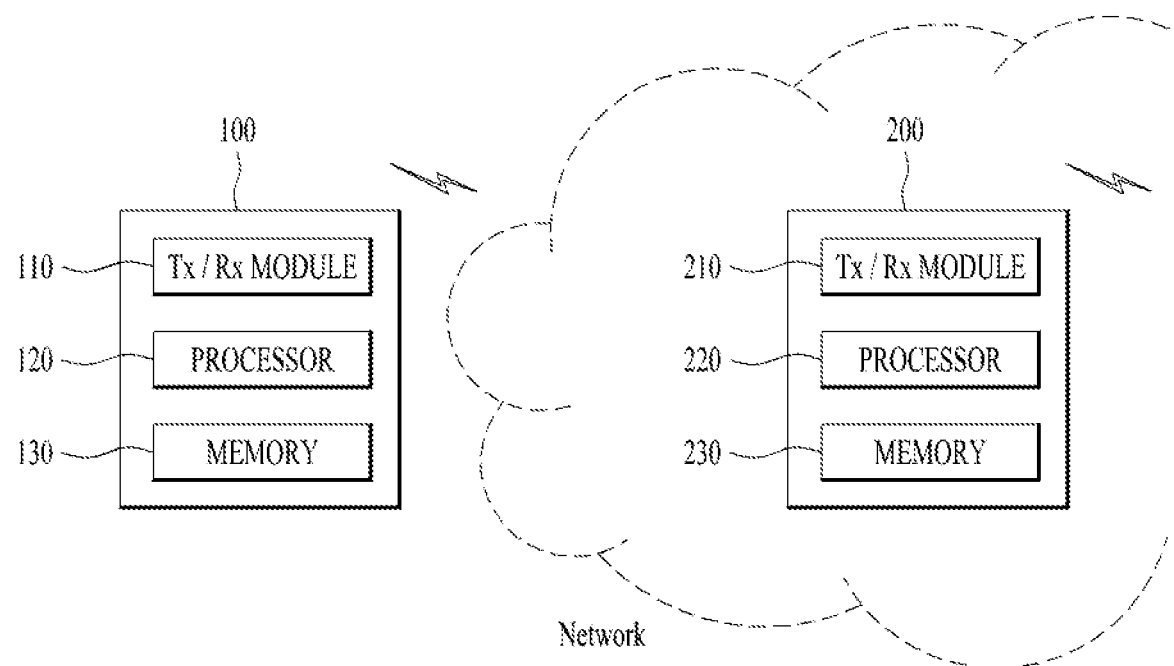
FIG. 14 illustrates a node device according to an embodiment of the present invention.

FIG. 14 illustrates configuration of a UE and a network node according to a preferred embodiment of the present invention.

The UE 100 according to the present invention may include a transmitting/receiving (Tx/Rx) module 110, a processor 120, and a memory 130. The Tx/Rx module 110 of the UE 100 may be referred to as a radio frequency (RF) unit or a transceiver. The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the Tx/Rx module 110. The memory 130 may store the calculated and processed information for a predetermined time, and may be replaced by another constituent such as a buffer (not shown).

The network node 200 according to the present invention may include a transmitting/receiving (Tx/Rx) module 210, a processor 220 and a memory 230. If the Tx/Rx module communicates with a UE 100, the Tx/Rx module 210 may be referred to as an RF unit or a transceiver. The Tx/Rx module 210 may be configured to transmit and receive various signals, data and information to and from an external device. The network node 200 may be connected to an external device by wire and/or wirelessly. The Tx/Rx module 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present invention, the processor 220 may control the Tx/Rx module 210 to transmit data or a message to a UE or another network node. The memory 230 may store the calculated and processed information for a predetermined time, and may be replaced by another constituent such as a buffer (not shown). In an access network, the network node 200 may be an eNB or a gNB. In a core network, the network nodes 200 may be an AMF device with an access and mobility management function, an SMF device with a session management function, a UPF device with a user plane function, and so on, according to network functions.

For configuration of the UE 100 and the network apparatus 200, the details described in various embodiments of the present invention may be independently applied or implemented such that two or more embodiments are simultaneously applied. For simplicity, redundant description is omitted.

Hereinafter, under the assumption that the network node 200 corresponds to an AMF device, an operation of the AMF device according to the present invention is described. The transceiver 210 of the AMF device 200 may receive a request associated with data notification to the UE 100 from the SMF device. The processor 220 of the AMF device 200 may control the transceiver 210 to perform an operation according to the request based on the request and a state of the UE or may control the transceiver 210 to transmit rejection of the request to the SMF device. For example, when the UE is not in a mode (e.g., a MICO mode) in which communication for mobile terminated data is restricted and the processor 220 of the AMF device 200 detects that the UE is in a non-allowed area in which a user service is restricted, if the data notification is not for regulatory prioritized services, the processor 220 may control the transceiver 210 to transmit rejection of the request. The processor 220 may control the transceiver 210 to transmit paging for the UE to a radio access network device (e.g., an eNB) if the data notification is for the regulatory prioritized service. The processor 220 may control the transceiver 210 to notify the SMF device of information indicating that the UE is in the non-allowed area, if the data notification is for the regulatory prioritized service. The processor 220 may consider an emergency service or a multimedia priority service (MPS) as the regulatory prioritized service.

The present invention may be implemented through various means. For example, the present invention may be implemented by hardware, firmware, software, or a combination thereof.

When implemented by hardware, a method according to the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP based system. Furthermore, the proposed method is applicable to a millimeter wave (mmWave) communication system using an ultrahigh frequency band.

The invention claimed is:

1. A method performed by an access and mobility management function (AMF), the method comprising:
   receiving, from a session management function (SMF), a request associated with data notification for a wireless device, wherein the wireless device is not in a Mobile Initiated Connection Only (MICO) mode;
   detecting that the wireless device is in a non-allowed area in which a communication service is restricted;
   rejecting the request and notifying the SMF that the wireless device is in the non-allowed area, unless the data notification is for a regulatory prioritized service;
   storing information informing that the SMF has been notified that the wireless device is in the non-allowed area; and
   transmitting paging for the wireless device to a radio access network device based on that the data notification is for the regulatory prioritized service.

2. The method according to claim 1, wherein the radio access network device is a base station (BS).

3. The method according to claim 1, wherein the regulatory prioritized service is an emergency service or a multimedia priority service (MPS).

4. An access and mobility management function (AMF) configured to operate in a wireless communication system, the AMF comprising:
   a memory;
   a transceiver; and
   a processor operatively coupled to the transceiver and the memory, wherein the processor is configured to:
   control the transceiver to receive, from a session management function (SMF), a request associated with data notification for a wireless device, wherein the wireless device is not in a Mobile Initiated Connection Only (MICO) mode;
   detect that the wireless device is in a non-allowed area in which a communication service is restricted;
   reject the request and control the transceiver to notify the SMF that the wireless device is in the non-allowed area, unless the data notification is for a regulatory prioritized service;
   store, in the memory, information informing that the SMF has been notified that the wireless device is in the non-allowed area; and
   control the transceiver to transmit paging for the wireless device to a radio access network device based on that the data notification is for the regulatory prioritized service.

5. The AMF according to claim 4, wherein the radio access network device is a base station (BS).

6. The AMF according to claim 4, wherein the regulatory prioritized service is an emergency service or a multimedia priority service (MPS).

* * * * *